(12) United States Patent
Hisamatsu

(10) Patent No.: US 10,533,607 B2
(45) Date of Patent: Jan. 14, 2020

(54) CAGE FOR RADIAL ROLLER BEARING

(71) Applicant: NSK LTD., Tokyo (JP)

(72) Inventor: Kiyotami Hisamatsu, Takasaki (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 15/105,067

(22) PCT Filed: Oct. 17, 2014

(86) PCT No.: PCT/JP2014/077745
§ 371 (c)(1),
(2) Date: Jun. 16, 2016

(87) PCT Pub. No.: WO2015/093137
PCT Pub. Date: Jun. 25, 2015

(65) Prior Publication Data
US 2016/0319870 A1   Nov. 3, 2016

(30) Foreign Application Priority Data

Dec. 17, 2013   (JP) .................. 2013-260242

(51) Int. Cl.
*F16C 33/51* (2006.01)
*F16C 19/30* (2006.01)

(52) U.S. Cl.
CPC .......... *F16C 33/516* (2013.01); *F16C 19/305* (2013.01)

(58) Field of Classification Search
CPC .............. F16C 33/4694; F16C 33/4635; F16C 2226/70–78; F16C 33/51; F16C 33/513; F16C 33/516
See application file for complete search history.

(56) References Cited

U.S. PATENT DOCUMENTS

| 3,163,477 A | * | 12/1964 | Schmidt | F16C 19/28 29/898.065 |
| 4,235,487 A | * | 11/1980 | Schard | F16C 19/463 384/576 |
| 4,397,507 A | * | 8/1983 | Kraus | F16C 33/4635 384/576 |
| 4,472,007 A | * | 9/1984 | De Vito | F16C 19/48 384/572 |
| 5,033,876 A | * | 7/1991 | Kraus | F16C 19/463 384/572 |

(Continued)

FOREIGN PATENT DOCUMENTS

| CN | 101137853 A | 3/2008 | |
| DE | 4007452 A1 | * 9/1991 | .......... F16C 33/4623 |

(Continued)

OTHER PUBLICATIONS

Machine Translation of DE-4007452 (Year: 1991).*

(Continued)

*Primary Examiner* — Alan B Waits
(74) *Attorney, Agent, or Firm* — Sughrue Mion, PLLC

(57) ABSTRACT

One end side projecting portion (30a) of a first cage element (9a) fits in the other end side recess portion (41b) of a second cage element (9b), and one end side projecting portion (30b) of the second cage element (9b) fits in the other end side recess portion (41a) of the first cage element (9a), whereby the first cage element (9a) and the second cage element (9b) are restrained from being displaced relatively in an axial direction.

1 Claim, 27 Drawing Sheets

(56) References Cited

U.S. PATENT DOCUMENTS

| | | | | |
|---|---|---|---|---|
| 5,178,474 | A * | 1/1993 | Muntnich | F16C 33/4635 384/572 |
| 6,261,005 | B1 * | 7/2001 | Winkler | F16C 33/502 384/577 |
| 8,757,889 | B2 * | 6/2014 | Jaekel | F16C 33/504 384/577 |
| 8,894,293 | B2 * | 11/2014 | Beck | F16C 33/4694 384/577 |
| 9,004,775 | B2 * | 4/2015 | Ishibashi | F16C 33/4635 384/577 |
| 9,145,917 | B2 * | 9/2015 | Ishibashi | F16C 33/4635 |
| 9,382,947 | B2 * | 7/2016 | Ishibashi | F16C 33/4694 |
| 9,623,474 | B2 * | 4/2017 | Steblau | B21D 53/12 |
| 9,651,089 | B2 * | 5/2017 | Ishibashi | F16C 33/4635 |
| 2002/0181821 | A1 | 12/2002 | Fugel et al. | |
| 2004/0156571 | A1 | 8/2004 | Kotani | |
| 2008/0131041 | A1 | 6/2008 | Nakano et al. | |
| 2008/0181549 | A1 | 7/2008 | Nakano et al. | |
| 2012/0275741 | A1 | 11/2012 | Ishibashi | |
| 2013/0272641 | A1 * | 10/2013 | Hachisuka | F16C 33/4694 384/577 |
| 2013/0308890 | A1 * | 11/2013 | Steblau | B21D 53/12 384/577 |
| 2015/0167740 | A1 * | 6/2015 | Ishibashi | F16C 33/4635 384/572 |
| 2015/0167741 | A1 * | 6/2015 | Ishibashi | F16C 33/4635 384/572 |
| 2016/0123392 | A1 * | 5/2016 | Steblau | F16C 33/4623 384/577 |

FOREIGN PATENT DOCUMENTS

| | | | |
|---|---|---|---|
| DE | 198 56 024 A1 | 6/2000 | |
| EP | 1262256 A1 | 12/2002 | |
| GB | 2448687 A | 10/2008 | |
| JP | 62-55735 U | 4/1987 | |
| JP | 04-78322 A | 3/1992 | |
| JP | 2004-324843 A | 11/2004 | |
| JP | 2004-353808 A | 12/2004 | |
| JP | 2007224953 A | 9/2007 | |
| JP | 2007224953 A * | 9/2007 | F16C 33/504 |
| JP | 2007-327609 A | 12/2007 | |
| JP | 2011-85207 A | 4/2011 | |
| JP | 2011117545 A | 6/2011 | |
| JP | 2011137510 A | 7/2011 | |
| JP | 2013-241995 A | 12/2013 | |
| WO | 2012/036154 A1 | 3/2012 | |

OTHER PUBLICATIONS

Machine Translation of JP-2007224953 (Year: 2007).*
Office Action dated Sep. 7, 2016, issued by the European Patent Office in counterpart European Application No. 14871240.9.
International Search Report for PCT/JP2014/077745 dated Jan. 20, 2015[PCT/ISA/210].
Written Opinion for PCT/JP2014/077745 dated Jan. 20, 2015 [PCT/ISA/237].
Communication dated May 17, 2017, from the State Intellectual Property Office of People's Republic of China in counterpart Application No. 201480069069.8.
Communication dated Jun. 20, 2017, from the European Patent Office in counterpart European Application No. 14871240.9.
Communication dated Oct. 24, 2019, issued by the European Patent Office in counterpart European Application No. 14 871 240.9.

* cited by examiner

CAGE FOR RADIAL ROLLER BEARING

TECHNICAL FIELD

The present invention relates to a cage for a radial roller bearing that is incorporated in a rotational support portion of a manual or automatic transmission for a motor vehicle or machinery of various types.

BACKGROUND ART

For example, in automotive manual transmissions, as shown in FIG. 27, it is conventional practice that a transmission gear 1 is supported rotatably via a radial roller bearing 3 that is assembled around the circumference of a power transmission shaft 2. In the radial roller bearing 3, a plurality of rollers 6 are provided so as to roll freely while being held by a cage 7 between a cylindrical outer ring raceway 4 provided on an inner circumferential surface of the transmission gear 1 and a cylindrical inner ring raceway 5 provided on an outer circumferential surface of the power transmission shaft 2. The inner ring raceway 5 may be provided directly on the outer circumferential surface of the power transmission shaft 2 or may be provided on an outer circumferential surface of a cylindrical inner ring that is provided separately. In the case of the construction shown in FIG. 27, the transmission gear 1 is positioned between a step portion 14 formed on the outer circumferential surface of the power transmission shaft 2 and a synchronizing hub 15 that is in spline engagement with the outer circumferential surface of the power transmission shaft 2.

Here, since the transmission gear 1 rotates in synchronization with the power transmission shaft 2, the radial roller bearing 3 is used in a state where the radial roller bearing 3 bears load and does not rotate relative to the transmission gear 1. However, with little load variation and long load bearing time, the rolling surfaces of the rollers 6 are kept in contact with the outer ring raceway 4 and the inner ring raceway 5 in the same position. Because of this, in the case of there being not much lubricant in the interior of the radial roller bearing 3, the oil film thickness at the contact portions becomes thin, resulting in fears that fretting corrosion is caused.

To prevent the generation of fretting corrosion as described above, it is conventional practice to apply a cage 7a (a so-called divided cage) shown in FIG. 28 to the cage 7 that is incorporated in the radial roller bearing 3 described above (refer to Patent Document 1). The cage 7a includes a pair of metallic cage elements 9 each having a partially cylindrical shape, and the cage 7a is formed into a cylindrical shape as a whole by aligning the pair of cage elements 9 in a circumferential direction. With the pair of cage elements 9 assembled together, the cage 7a includes a pair of arc-shaped rim portions 10 that are disposed coaxially in an axial direction (unless otherwise described, when used herein, axial and radial directions denote axial and radial directions of the cage. This will be true in the whole of the description and claims.) and a plurality of pillar portions 11 that are disposed at constant intervals in the circumferential direction in such a way as to connect together the pair of rim portions 10 in the axial direction. Outer circumferential surfaces of the pair of rim portions 10 and the plurality of pillar portions 11 reside on the same cylindrical surface along the full circumference.

Then, spaces surrounded by the pillar portions 11 that lie adjacent to each other in the circumferential direction and the pair of rim portions 10 make up pockets 12 for holding the rollers 6 in a rolling fashion. As shown in FIG. 27, an annular space 13 where the rollers 6 are disposed exists between the outer ring raceway 4 and the inner ring raceway 5. Total of circumferential lengths of the cage elements 9 are slightly shorter than a circumferential length of the annular space 13.

According to this construction, the cage element 9 that exists in a non-loaded range (an opposite side portion to a side power to which a radial load is exerted) of an annular space 13 is allowed to be displaced slightly in the circumferential direction. Owing to this, even in the event that the power transmission shaft 2 rotates in synchronism with the transmission gear 1, the contact portions between the rolling surfaces of the rollers 6 and the outer ring raceway 4 and the inner ring raceway 5 are allowed to move bit by bit, hence it is possible to prevent the generation of fretting corrosion at the contact portions.

Incidentally, the pair of cage elements 9 that make up the divided cage 7a described above do not have a function to refrain themselves from being displaced relative to each other in the axial direction. Then, the pair of cage elements 9 are restrained from being displaced relative to each other in the axial direction by a C-shaped snap ring 17 (a mating member) that is fitted in a recessed groove 16 that is provided on the power transmission shaft 2 via a flat washer 21. As shown in FIG. 29, the other axial end face 19 of the C-shaped snap ring 17 that is axially opposite to one axial end face of the radial roller bearing 3 (axial end faces 18 of the rim portions 10 of the cage elements 9) is formed into a discontinuous surface having a discontinuous portion 20 formed by cutting a circumferential portion of the other axial end face 19.

RELATED ART REFERENCE

Patent Document

Patent Document 1: JP-A-2007-327609

SUMMARY OF THE INVENTION

Problems to be Solved by the Invention

On the other hand, in the case of there being no flat washer 21, the axial lengths of the transmission gear 1 and the power transmission shaft 2 can be shortened, a reduction in weight and production cost of the transmission can be realized. In addition, as shown in FIG. 31, not only is the flat washer 21 disposed of but also the axial lengths of the divided cage 7a and the rollers 6 are increased without changing the circumferential dimension, whereby the loading capacity of the radial roller bearing 3 can be increased.

In the configuration shown in FIG. 31, however, since the flat washer 21 is not provided, the axial end faces 18 of the pair of cage elements 9 are likely to be brought into direct contact with the other axial end face 19 of the C-shaped snap ring 17. Additionally, since the pair of cage elements 9 do not have the function to restrain themselves from being displaced relative to each other in the axial direction, one (the lower one in FIG. 30) of the pair of cage elements 9 moves towards the C-shaped snap ring 17 (in a direction indicated by an arrow in FIG. 30), whereby a circumferential end portion of the rim portion 10 and a circumferential end portion of the C-shaped snap ring 17 are likely to interfere with each other, as shown in FIG. 30. As this occurs, there are fears that the divided cage 7a is restrained from rotating to be broken. To deal with this, as shown in FIG. 29, the interference of the rim portion 10 with the C-shaped snap ring 17 needs to be suppressed by interposing the flat washer 21 therebetween.

The invention has been made in view of the problem described above, and an object thereof is to provide a radial roller bearing cage that can restrict an axial relative movement between first and second cage elements to thereby obviate the necessity of a flat washer so as to reduce an axial length of a power transmission shaft.

Means for Solving the Problems

The object of the invention will be achieved by the following configurations.

(1) A radial roller bearing cage including a first and second metallic cage elements each having a pair of arc-shaped rim portions that are disposed so as to be spaced apart from each other in an axial direction and a plurality of pillar portions that are disposed at constant intervals in a circumferential direction so as to connect the pair of rim portions in the axial direction, the first and second cage elements being assembled together to be formed into a cylindrical shape as a whole, the pillar portions that lie adjacent to one another in the circumferential direction and the pairs of rim portions defining a plurality of pockets in which rollers are held so as to roll freely, wherein:

circumferential end faces of the first and second cage elements each have at least one end side projecting portion that is provided so as to project towards one circumferential end side;

the other circumferential end faces of the first and second cage elements each have at least one other end side recess portion that is provided so as to be recessed towards the one circumferential end side;

the one end side projecting portion of the first cage element fits in the other end side recess portion of the second cage element; and the one end side projecting portion of the second cage element fits in the other end side recess portion of the first cage element, whereby the first cage element and the second cage element are restrained from being displaced relatively in the axial direction.

(2) The radial roller bearing cage according to (1), wherein the other axial end face of a mating member that faces one axial end face of a bearing in the axial direction is used at a location that constitutes a discontinuous surface where a circumferential portion is cut out.

(3) The radial roller bearing cage according to (2), wherein:

the radial roller bearing cage is incorporated in a radial roller bearing that is assembled to a power transmission shaft; and the mating member is a C-shaped snap ring that is fitted in a recessed groove that is provided on the power transmission shaft.

Advantage of the Invention

According to the radial roller bearing cage that is configured in the way described above, the first one end side projecting portion and the second other end side projecting portion that lie adjacent to each other in the axial direction are brought into abutment with each other for engagement, and the second one end side projecting portion and the first other end projecting portion that lie adjacent to each other in the axial direction are brought into abutment with each other for engagement. Consequently, the first and second cage elements can be restricted from being displaced relative to each other in the axial direction.

MODES FOR CARRYING OUT THE INVENTION

Figure 1:
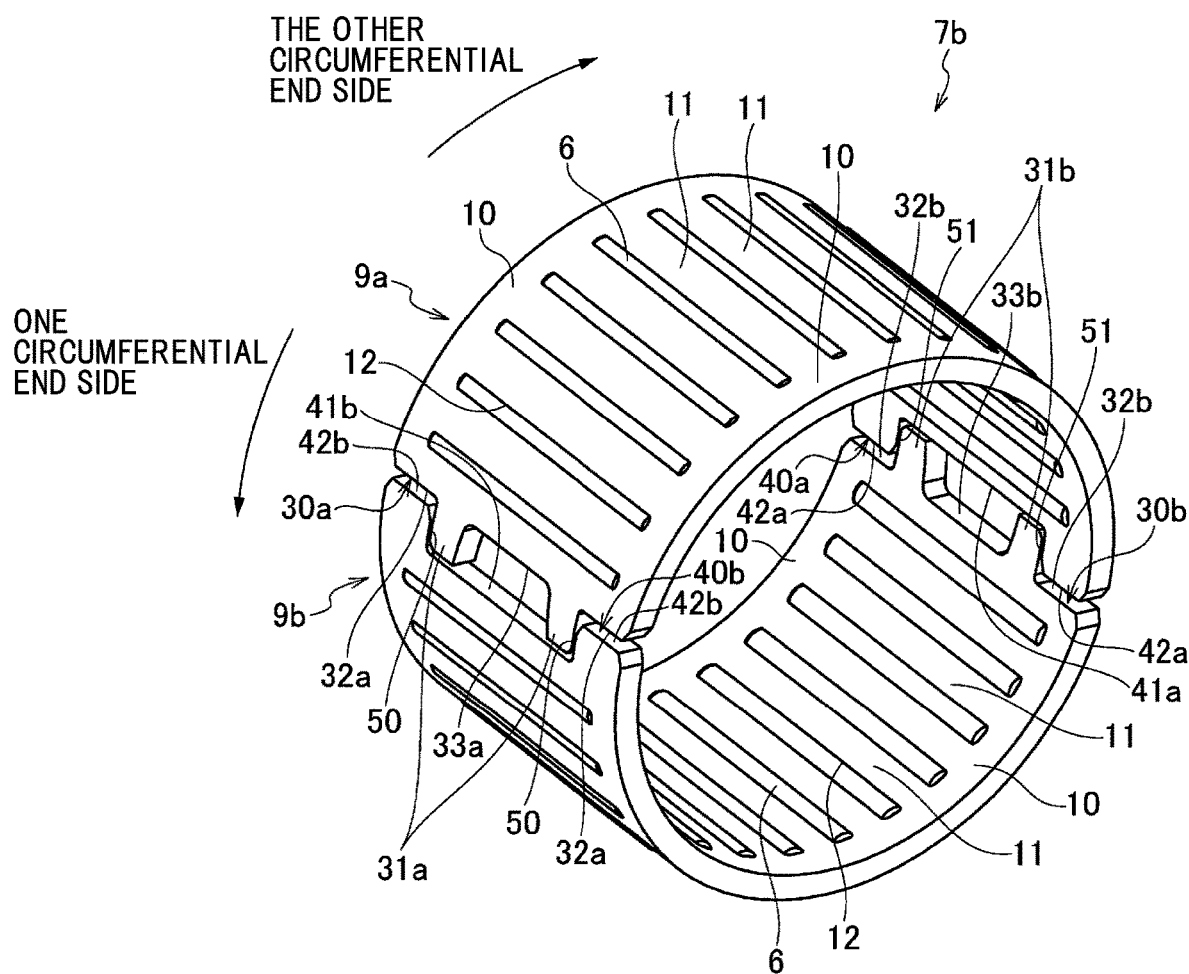
FIG. 1 is a perspective view of a radial roller bearing cage according to a first embodiment.

Hereinafter, referring to the drawings, radial roller bearing cages according to embodiments of the invention will be described in detail.

First Embodiment

Figure 2:
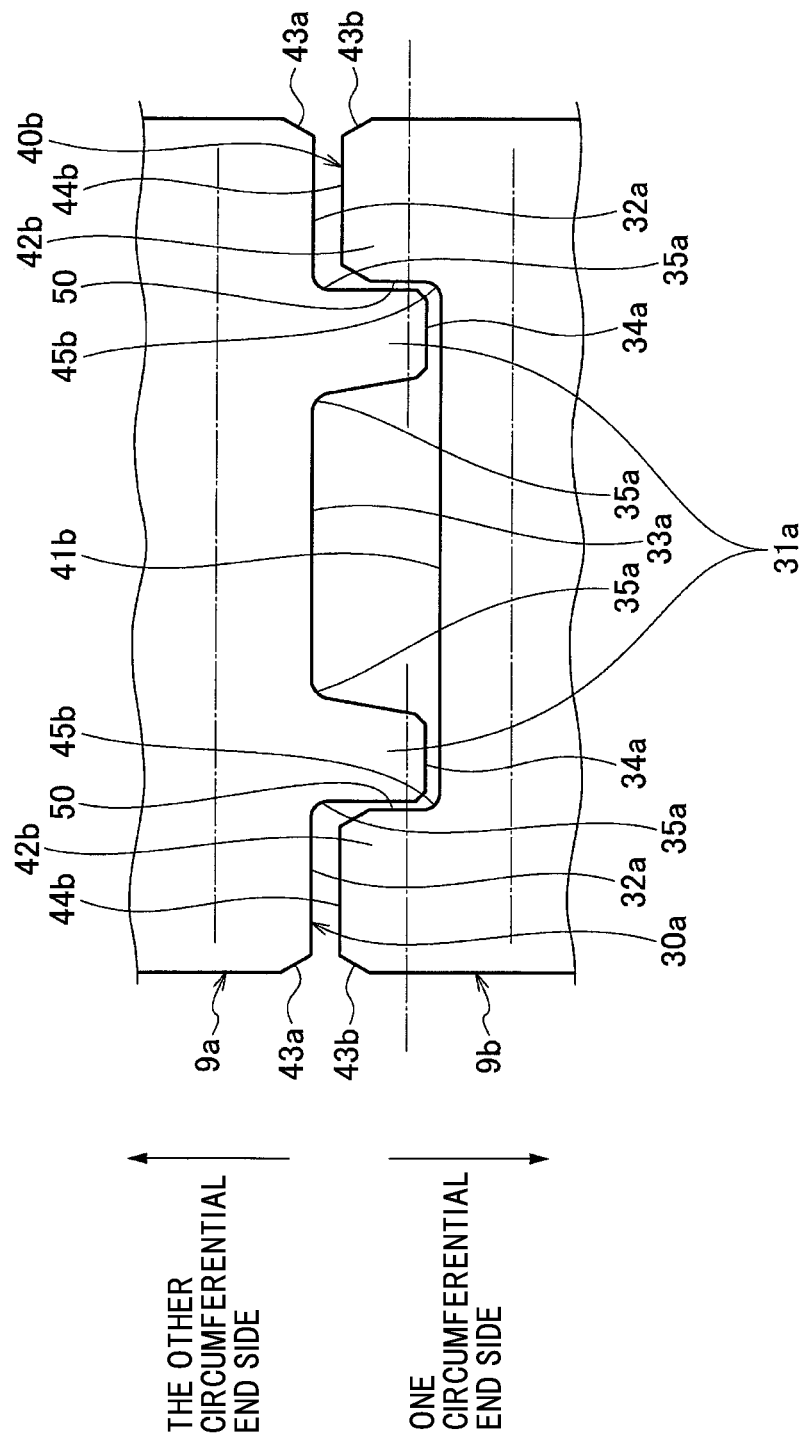
FIG. 2 shows a view of a main part of the radial roller bearing cage shown in FIG. 1 as viewed from a radially outer side thereof.
Figure 28:
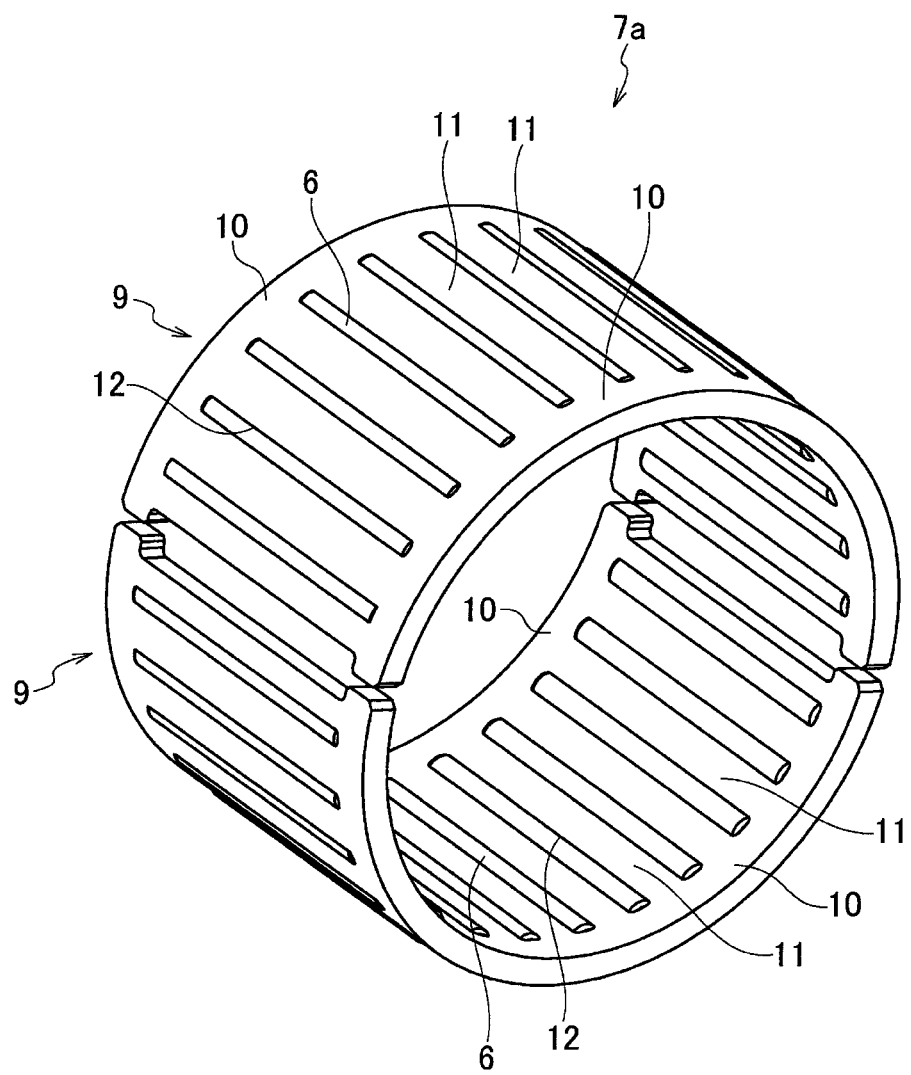
FIG. 28 is a perspective view of the conventional radial roller bearing cage.
Figure 29:
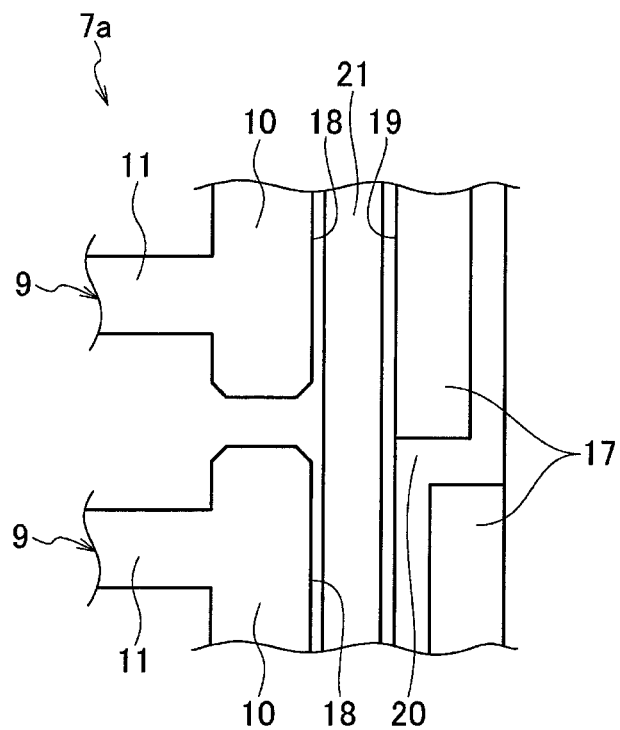
FIG. 29 shows a view of the conventional radial roller bearing cage as viewed from a direction indicated by an arrow A in FIG. 27, showing partially cage elements, a C-shaped snap ring and a flat washer with a transmission gear not shown.
Figure 30:
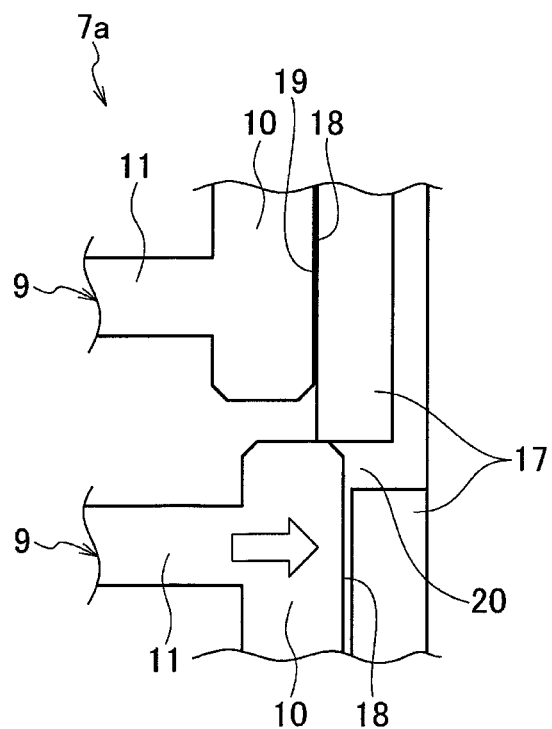
FIG. 30 shows a view of the conventional radial roller bearing cage as viewed from a direction indicated by an arrow B in FIG. 31, showing partially the cage elements and the C-shaped snap ring with the transmission gear not shown.

FIGS. 1 and 2 show a radial roller bearing cage 7b according to a first embodiment of the invention. A basic construction of the radial roller bearing cage 7b other than characteristic portions thereof is almost the same as the construction of the conventional cage 7a shown in FIG. 28. Thus, like reference numerals to those given in the figure will be given to like configurations to those of the conventional cage 7a, and the description thereof will be omitted or made briefly. Hereinafter, characteristic portions of this embodiment will mainly be described.

The radial roller bearing cage 7b is configured into a cylindrical shape as a whole by aligning first and second partially cylindrical (semi-cylindrical) cage elements 9a, 9b, which are obtained by forming sheet metal or iron, in a circumferential direction. The first and second cage elements 9a, 9b each have a pair of arc-shaped rim portions 10 that are disposed so as to be spaced apart from each other in an axial direction and a plurality of pillar portions 11 that are disposed at constant intervals in a circumferential direction so as to connect the pair of rim portions 10 together in the axial direction. The pair of rim portions 10 each have a rectangular cross section and are formed into a circular ring shape as a whole with the first and second cage elements 9a, 9b assembled together.

Then, the radial roller bearing cage 7b is formed into a cylindrical shape as a whole by assembling together the first and second cage elements 9a, 9b. Rollers 6 are held individually in a plurality of pockets 12 that are defined by the pillar portions 11 that lie adjacent to each other in the circumferential direction and the pair of rim portions 10 so as to roll freely therein.

Circumferential end faces 30a, 30b (end faces aligned in a counterclockwise direction in FIG. 1) of the first and second cage elements 9a, 9b are made up of first and second one end side projecting portions 31a, 31b that are provided so as to project towards one circumferential end side from axial middle portions and the pair of first and second pairs of one end side recess portions 32a, 32b that are provided so as to be recessed towards the other circumferential end side from both axial sides, the first and second one end side projecting portions 31a, 31b and the first and second pairs of one end side recess portions 32a, 32b being formed continuously in the axial direction.

The other circumferential end faces 40a, 40b (end faces aligned in a clockwise direction in FIG. 1) of the first and second cage elements 9a, 9b are made up of first and second other end side recess portions 41a, 41b that are provided so as to be recessed towards the one circumferential end side from axial middle portions and first and second pairs of other end side projecting portions 42a, 42b that are provided so as to project towards the other circumferential end side from both axial sides, the first and second other end side recess portions 41a, 41b and the first and second pairs of other end side projecting portions 42a, 42b being formed continuously in the axial direction. The first and second other end side recess portions 41a, 41b are formed so as to face the second and first one end side projecting portions 31b, 31a in the circumferential direction, respectively. The first and second other end side projecting portions 42a, 42b are formed so as to face the second and first one end side recess portions 32b, 32a in the circumferential direction, respectively.

In FIG. 2, only peripheries of the circumferential end face 30a of the first cage element 9a and the other circumferential end face 40b of the second cage element 9b are shown. However, the circumferential end face 30b of the second cage element 9b has substantially the same construction of that of the circumferential end face 30a of the first cage element 9a, and the other circumferential end face 40a of the first cage element 9a has substantially the same construction as that of the other circumferential end face 40b of the second cage element 9b. Consequently, a detailed illustration of the circumferential end face 30b of the second cage element 9b and the other circumferential end face 40a of the first cage element 9a will be omitted here.

Groove portions 33a, 33b are provided at axial middle portions of the first and second one end side projecting portions 31a, 31b so as to be recessed towards the other circumferential end side. A radially inner side and a radially outer side of the cage 7b communicate with each other by the groove portions 33a, 33b.

The first one end side projecting portion 31a fits in the second other end side recess portion 41b, and the second other end side projecting portions 42b fit in the first one end side recess portions 32a. This brings the first one end side projecting portion 31a and the second other end side projecting portions 42b that lie adjacent to each other in the axial direction into abutment with each other in the axial direction for engagement. FIGS. 1 and 2 show a pair of first engaging portions, denoted by reference numerals 50, where the first one end side projecting portion 31a and the pair of second other end side projecting portions 42b are in abutment with each other in the axial direction for engagement.

Additionally, the second one end side projecting portion 31b fits in the first other end side recess portion 41a, and the first other end side projecting portions 42a fit in the second one end side recess portions 32b. This brings the second one end side projecting portion 31 and the first other end side projecting portions 42a that lie adjacent to each other in the axial direction into abutment with each other in the axial direction for engagement. FIG. 1 shows a pair of second engaging portions, denoted by reference numerals 51, where the second one end side projecting portion 31b and the pair of first other end side projecting portions 42a are in abutment with each other in the axial direction for engagement.

Figure 31:
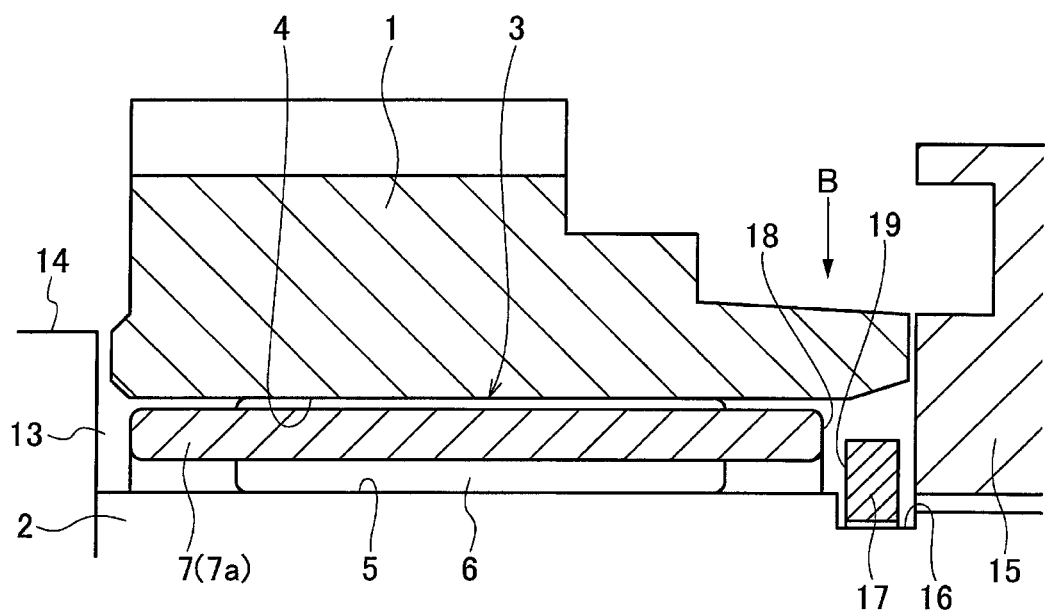
FIG. 31 is a sectional view showing a state in which the conventional radial roller bearing cage is incorporated in another automotive manual transmission.

In this way, since the cage 7b of this embodiment includes the first and second engaging portions 50, 51, the first and second cage elements 9a, 9b can be restricted from being displaced relatively in the axial direction. Consequently, when this cage 7b is applied to the construction shown in FIG. 31, even in the event that a load is exerted in a direction indicated by an arrow in FIG. 3, there is no such situation that only one of the cage elements 9a, 9b is moved in the axial direction. In addition, since the interference of the first and second cage elements 9a, 9b with the C-shaped snap ring 17 is prevented, it is possible to prevent the cage 7b from being restrained from rotating or being broken.

Figure 3:
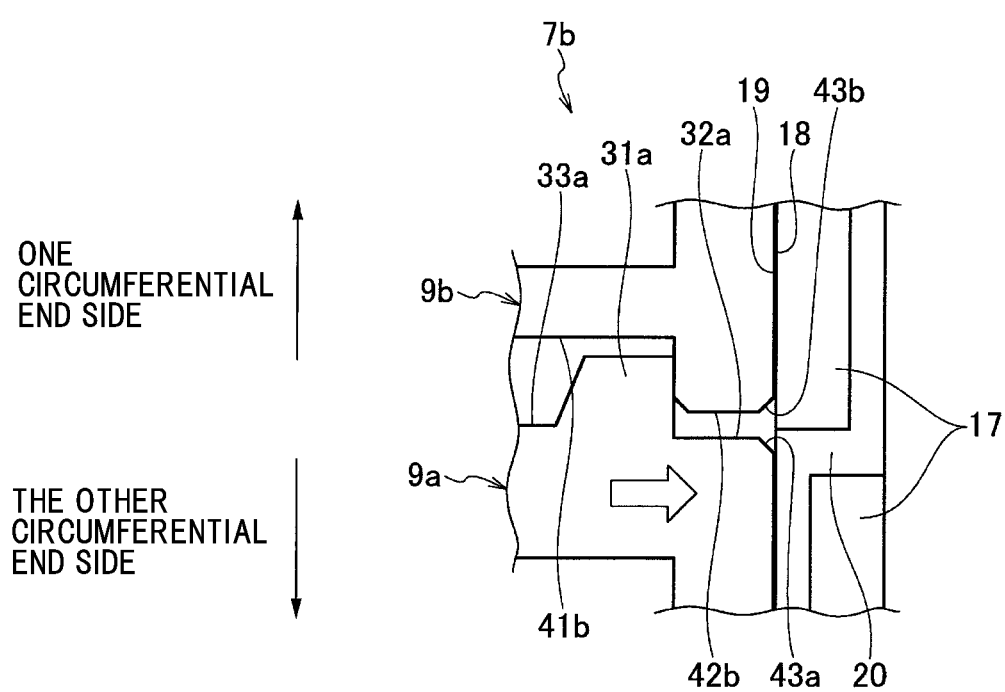
FIG. 3 shows a view showing partially cage elements and a C-shaped snap ring as seen from a radial direction with the radial roller bearing cage incorporated in an automotive manual transmission.

As shown in FIGS. 2 and 3, the one circumferential end faces 30a, 30b and the other circumferential end faces 40a, 40b of the first and second cage elements 9a, 9b are chamfered to be tapered at both axial side end portions 43a, 43b, however the axial side end portions 43a, 43b may be rounded. By adopting these configurations, the contact of the axial side end portions 43a, 43b with the C-shaped snap ring 17 can be prevented.

As shown in FIG. 2, in the first one end side projecting portion 31a, both axial side end portions of distal end faces 34a are chamfered to be tapered, and roots 35a thereof are rounded. The axial side end portions of the distal end faces 34a may be not only tapered but also rounded. Although not shown, the second one end side projecting portion 31b also has the same configuration.

In the second other end side projecting portions 42b, distal end faces 44b are chamfered to be tapered at both axial side end portions, and roots 45b thereof are rounded. The axial side end portions of the distal end faces 44b may be not only tapered but also rounded. Although not shown, the first other end side projecting portions 42a also have the same configuration.

In this way, the axial side end portions of the distal end faces 34a, 44b of the first one end side projecting portion 31a and the second other end side projecting portions 42b are tapered, whereby the axial side end portions of the distal end faces 34a, 44a can be prevented from interfering with the roots 45b, 35a of the second other end side projecting portions 42b and the first one end side projecting portion 31a that face circumferentially the axial side end portions of the distal end faces 34a, 44b, respectively. Further, in fitting together the first and second cage elements 9a, 9b, the first other side projecting portions 42a and the second one end side projecting portion 31b can be brought into smooth engagement with each other. Even though the first and second cage elements 9a, 9b are brought into contact with each other during rotation, it is possible to suppress the wear of the distal end faces 34a, 44b.

In addition, the roots 35a, 45b of the first one end side projecting portion 31a and the second other end side projecting portions 42b are rounded, whereby stress that would be exerted on the roots 35a, 45b can be reduced.

In this embodiment, since the groove portions 33a, 33b are provided so as to be recessed in the first and second one end side projecting portions 31a, 31b, the amount of lubricant that flows in a radial direction can be increased, thereby making it possible to prevent the occurrence of fretting corrosion that would otherwise be caused by a failure to form an oil film. In addition, since the groove portions 33a, 33b facilitate the stay of lubricant in an interior of the bearing, the formation of oil films at the contact portions of the first and second cage elements 9a, 9b can be ensured, thereby making it possible to suppress the wear of the contact portions. The provision of the groove portions 33a, 33b can realize a reduction in weight of the cage 7b. In the case of the width and diameter of the cage 7b being great, the groove portions 33a, 33b are effective in refraining the first and second cage elements 9a, 9b from being deformed when they are subjected to heat treatment.

In this embodiment, while the first and second cage elements 9a, 9b have the same shape to reduce the production cost, the first and second cage elements 9a, 9b may be shaped differently provided that the configurations of the circumferential end faces 30a, 30b and the other circumferential end faces 40a, 40b remain the same as those of the embodiment that has been described heretofore.

Second Embodiment

Next, a radial roller bearing cage according to a second embodiment of the invention will be described. A basic configuration of the radial roller bearing cage of this embodiment is the same as that of the first embodiment (refer to FIGS. 1 and 2), and like reference numerals will be given to like or corresponding portions to those of the first embodiment, so that the description thereof will be omitted or simplified herein.

Figure 4:
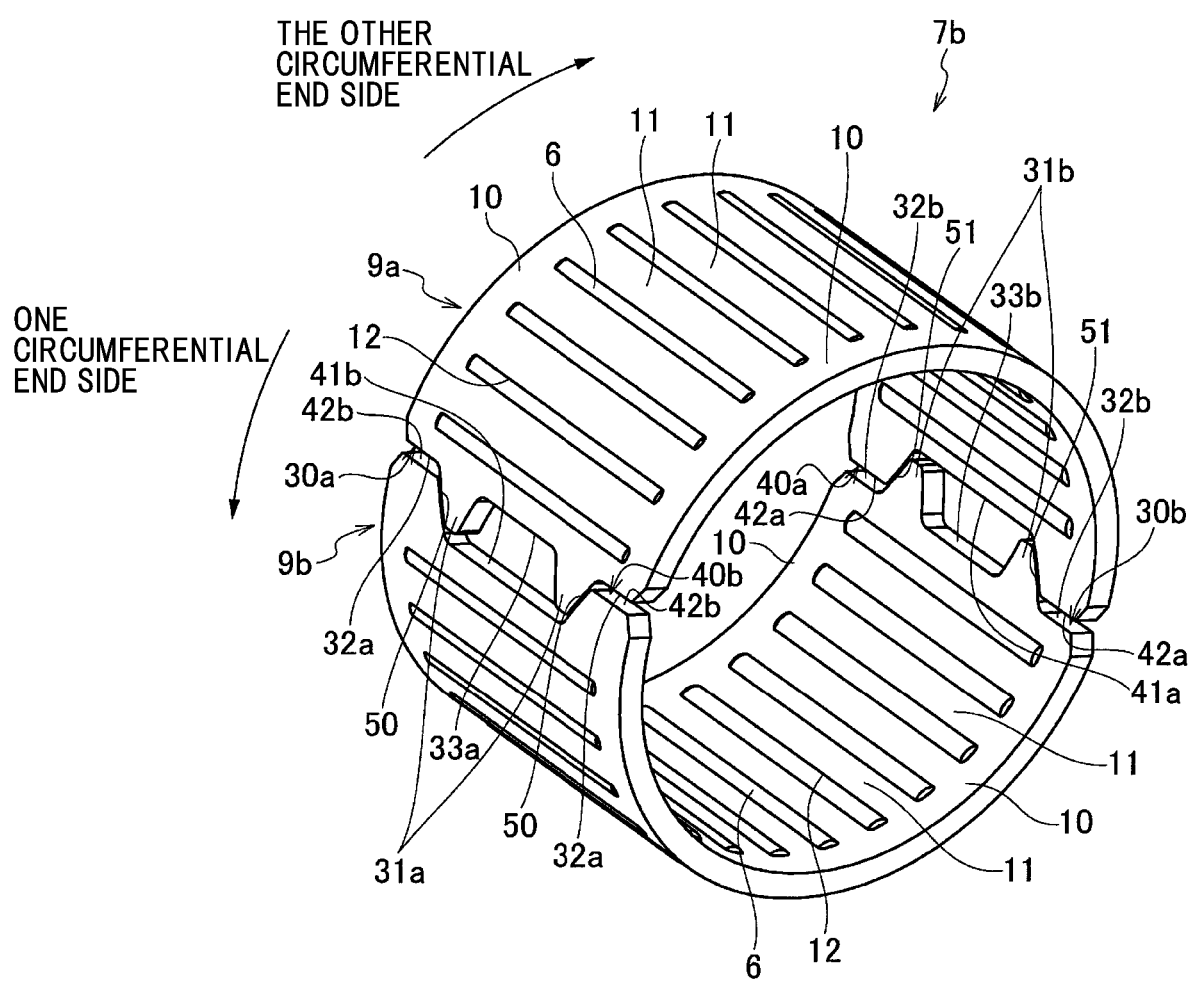
FIG. 4 is a perspective view of a radial roller bearing cage according to a second embodiment.
Figure 5:
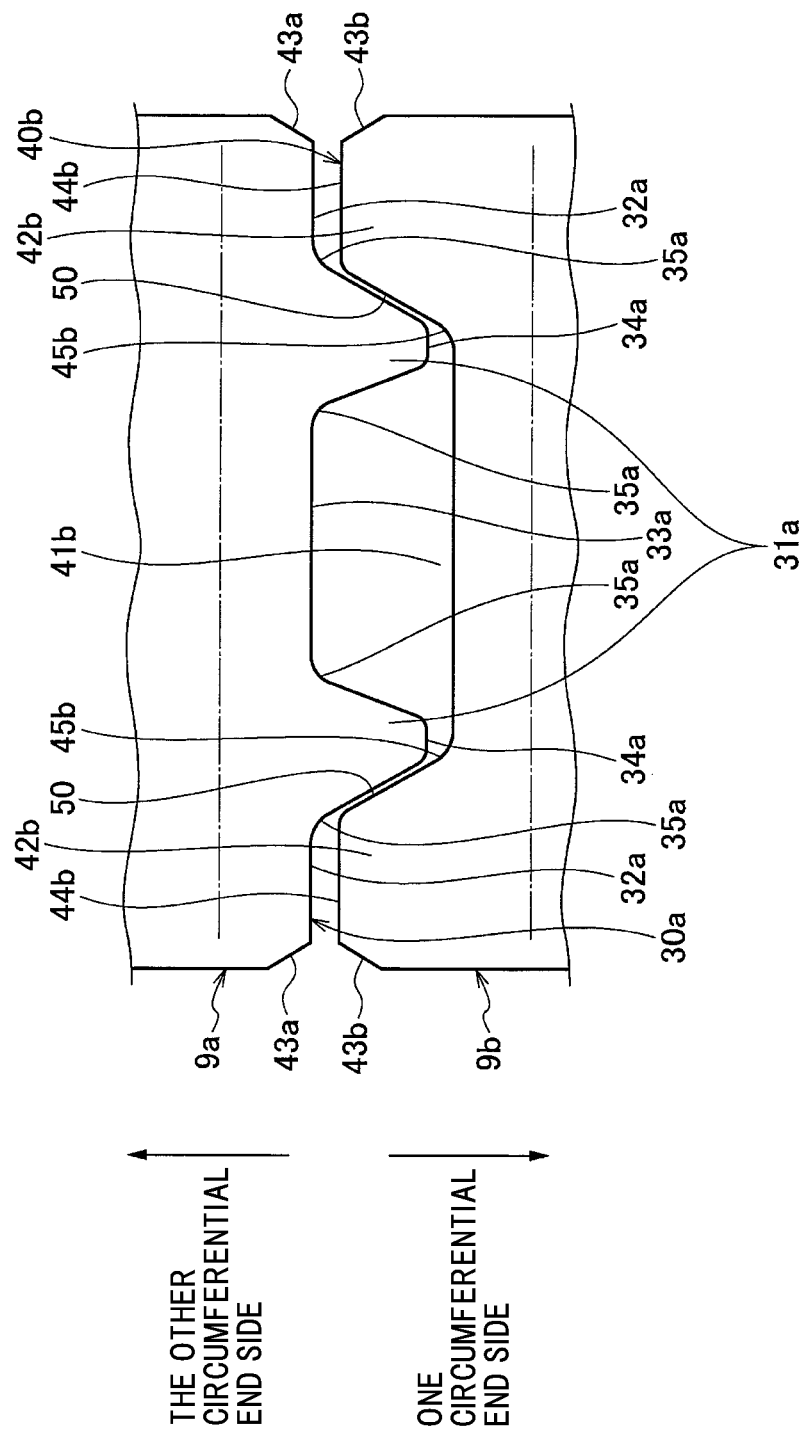
FIG. 5 shows a view of a main part of the radial roller bearing cage shown in FIG. 4 as viewed from a radially outer side thereof.

In a cage 7b of the second embodiment, a first one end side projecting portion 31a and a second other end side recess portion 41b are formed so that axial widths thereof get smaller as they extend towards one circumferential end side, as shown in FIGS. 4 and 5. Second other end side projecting portions 42b and first one end side recess portions 32a are formed so that axial widths thereof get smaller as they extend towards the other circumferential end side. First engaging portions 50 where the first one end side projecting portion 31a is brought into abutment with the second other end side projecting portions 42b in an axial direction are inclined axially inwards as they extend towards the one circumferential end side.

Although not shown so detailed as in FIG. 5, as shown in FIG. 4, a second one end side projecting portion 31b and a first other end side recess portion 41a are formed so that axial widths thereof get smaller as they extend towards the one circumferential end side. First other end side projecting portions 42a and second one end side recess portions 32b are formed so that axial widths thereof get smaller as they extend towards the other circumferential end side. Second engaging portions 51 where the second one end side projecting portion 31b is brought into abutment with the first other end side projecting portions 42a in the axial direction are inclined axially inwards as they extend towards the one circumferential end side.

By adopting this configuration, in this embodiment, compared with the first embodiment, first and second cage elements 9a, 9b can easily be fitted together.

In addition, the cage 7b is subjected to thrust force by the skew of rollers 6 (refer to FIG. 31), hence an axial force is exerted on the first and second cage elements 9a, 9b, whereby the first and second cage elements 9a, 9b are brought into contact with each other at the first or second engaging portions 50, 51. In this embodiment, however, since the first and second engaging portions 50, 51 are inclined, compared with the first embodiment, contact areas of the first and second engaging portions 50, 51 are increased, which is effective in reducing the wear the cage elements.

In this embodiment, as shown in FIG. 5, distal end faces 34a, 44b of the first one end side projecting portion 31a and the second other end side projecting portions 42b are rounded as a whole. However, the magnitude of roundness may be such that it can be removed through barreling. Distal end faces of the first other end side projecting portions 42a and the second one end side projecting portion 31b are formed similarly.

Third Embodiment

Next, a radial roller bearing cage according to a third embodiment of the invention will be described. A basic configuration of the radial roller bearing cage of this embodiment is the same as that of the first embodiment (refer to FIGS. 1 and 2), and like reference numerals will be given to like or corresponding portions to those of the first embodiment, so that the description thereof will be omitted or simplified herein.

Figure 6:
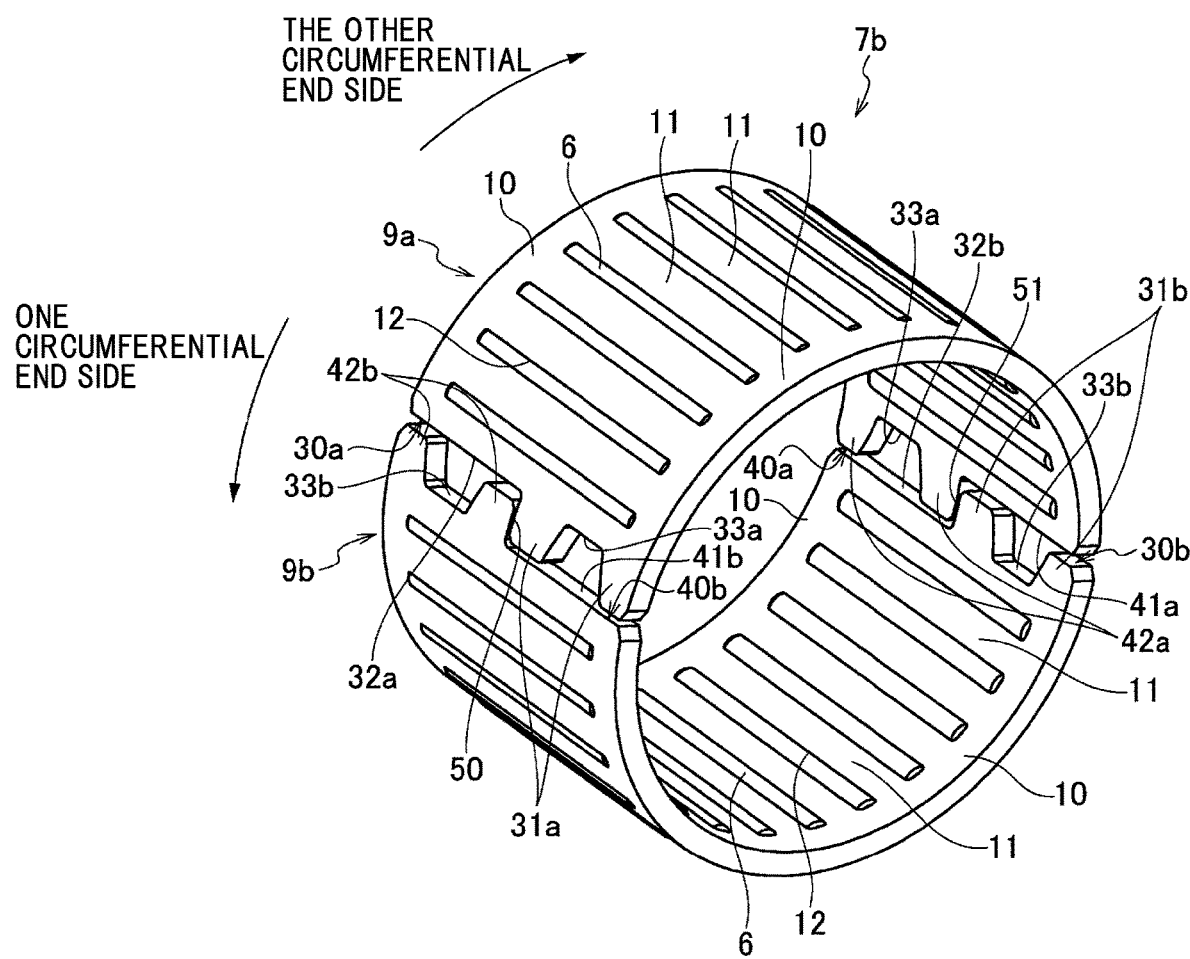
FIG. 6 is a perspective view of a radial roller bearing cage according to a third embodiment.
Figure 7:
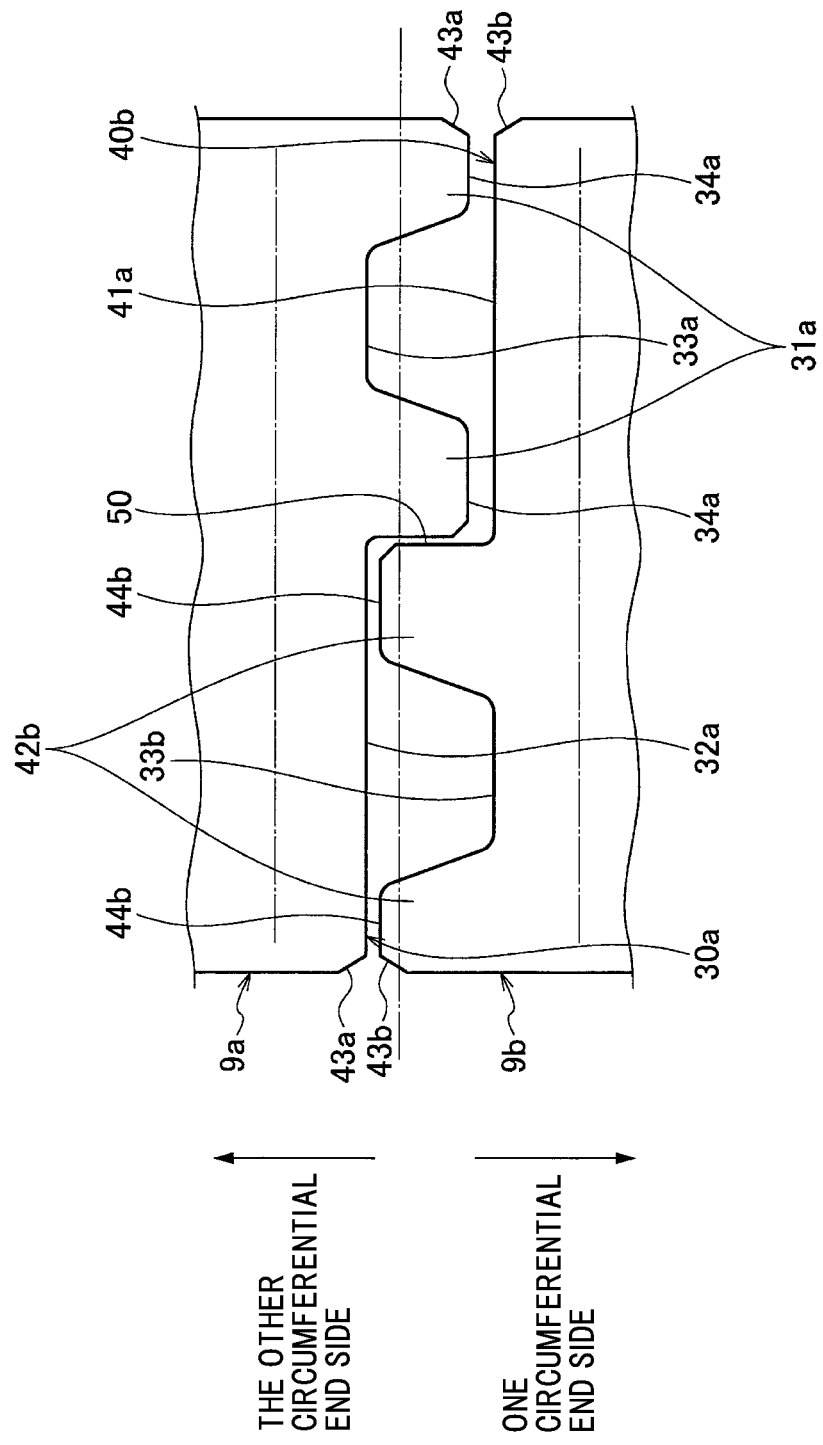
FIG. 7 shows a view of a main part of the radial roller bearing cage shown in FIG. 6 as viewed from a radially outer side thereof.

In this embodiment, as shown in FIGS. 6 and 7, circumferential end faces 30a, 30b of first and second cage elements 9a, 9b include first and second one end side projecting portions 31a, 31b that are provided so as to project towards one circumferential end side from axial portions (right hand portions in FIGS. 6 and 7) thereof and first and second one end side recess portions 32a, 32b that are provided so as to be recessed towards the other circumferential end side from the other axial portions (left hand portions in FIGS. 6, 7) thereof, the first and second one end side projecting portions 31a, 31b and the first and second one end side recess portions 32a, 32b being formed continuously on the circumferential end faces 30a, 30b, respectively.

The other circumferential end faces 40a, 40b of the first and second cage elements 9a, 9b include first and second other end side recess portions 41a, 41b that are provided so as to be recessed towards the one circumferential end side from axial portions thereof and first and second other end side projecting portions 42a, 42b that are provided so as to project towards the other circumferential end side from the other axial portions thereof, the first and second other end side recess portions 41a, 41b and the first and second other end side projecting portions 42a, 42b being formed continuously on the other circumferential end faces 40a, 40b, respectively. The first and second other end side recess portions 41a, 41b are formed so as to face the second and first one end side projecting portions 31b, 31a, respectively, in the circumferential direction. The first and second other end side projecting portions 42a, 42b are formed so as to face the second and first one end side recess portions 32b, 32a, respectively, in the circumferential direction.

In FIG. 7, only peripheries of the circumferential end surface 30a of the first cage element 9a and the other circumferential end face 40b of the second cage element 9b are shown. However, the circumferential end face 30b of the second cage element 9b has substantially the same construction as that of the circumferential end face 30a of the first cage element 9a, and the other circumferential end face 40a of the first cage element 9a has substantially the same construction as that of the other circumferential end face 40b of the second cage element 9b. Consequently, a detailed illustration of the circumferential end face 30b of the second cage element 9b and the other circumferential end face 40a of the first cage element 9a will be omitted here.

Groove portions 33a, 33b are provided at axial middle portions of the first and second one end side projecting portions 31a, 31b so as to be recessed towards the other circumferential end side. Groove portions 33a, 33b are provided at axial middle portions of the first and second other end side projecting portions 42a, 42b so as to be recessed towards the one circumferential end side. A radially inner side and a radially outer side of the cage 7b are allowed to communicate with each other through these groove portions 33a, 33b.

The first one end side projecting portion 31a fits in the second other end side recess portion 41b, and the second other end side projecting portion 42b fits in the first one end side recess portion 32a. This brings the first one end side projecting portion 31a and the second other end side projecting portion 42b, which lie adjacent to each other in the axial direction, into abutment with each other in the axial direction to thereby form a first engaging portion 50.

The second one end side projecting portion 31b fits in the first other end side recess portion 41a, and the first other end side projecting portion 42a fits in the second one end side recess portion 32b. This brings the second one end side projecting portion 31b and the first other end side projecting portion 42a, which lie adjacent to each other in the axial direction, into abutment with each other in the axial direction to thereby form a second engaging portion 51.

In this way, in the cage 7b of this embodiment, being different from the first embodiment (refer to FIGS. 2 and 1), the first engaging portion 50 and the second engaging portion 51 are provided in a single number in such a way as to be point symmetrical with each other. Consequently, in the event that an external force is exerted on the cage 7b from one axial side to the other side (from a right hand side to a left hand side in FIGS. 6 and 7), a relative displacement of the first and second cage elements 9a, 9b is prevented by the first engaging portion 50. On the contrary to this, in the event that an external force is exerted on the cage 7b from the other axial side to the one axial side (from the left hand side to the right hand side in FIGS. 6 and 7), a relative displacement of the first and second cage elements 9a, 9b is prevented by the second engaging portion 51. Consequently, with the cage 7b of this embodiment, too, when the cage 7b is applied to the construction shown in FIG. 31, the first and second cage elements 9a, 9b can be prevented from interfering with the C-shaped snap ring 17, thereby making it possible to prevent the cage 7b from being restrained from rotating or being broken.

In the cage 7b of this embodiment, since the first and second engaging portions 50, 51 are each provided one only, which can simplify the mold used to form the cage elements, thereby making it possible to reduce the projection cost.

The other advantages are similar to those of the first embodiment.

Fourth Embodiment

Next, a radial roller bearing cage according to a fourth embodiment of the invention will be described. A basic configuration of the radial roller bearing cage of this embodiment is the same as that of the third embodiment (refer to FIGS. 6 and 7), and like reference numerals will be given to like or corresponding portions to those of the third embodiment, so that the description thereof will be omitted or simplified herein.

Figure 8:
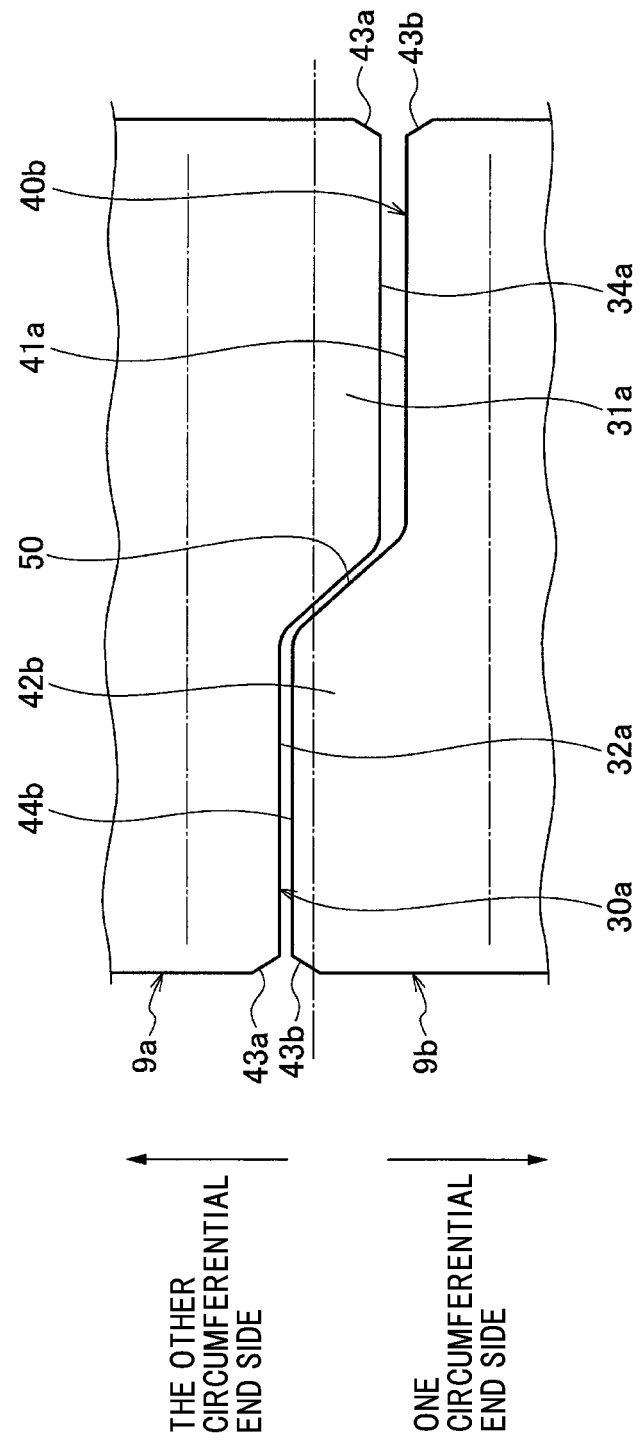
FIG. 8 shows a view of a main part of a radial roller bearing cage according to a fourth embodiment as viewed from a radially outer side thereof.

As shown in FIG. 8, in this embodiment, a first one end side projecting portion 31a and a second other end side recess portion 41b are formed so that axial widths thereof get smaller as they extend towards one circumferential end side. A second other end side projecting portion 42b and a first one end side recess portion 32a are formed so that axial widths thereof get smaller as they extend towards the other circumferential end side. A first engaging portion 50 where the first one end side projecting portion 31a is brought into abutment with the second other end side projecting portion 42b in an axial direction is inclined axially inwards as it extends towards the one circumferential end side.

Although not shown, a second one end side projecting portion 31b and a first other end side recess portion 41a are formed so that axial widths thereof get smaller as they extend towards the one circumferential end side. A first other end side projecting portion 42a and a second one end side recess portion 32b are formed so that axial widths thereof get smaller as they extend towards the other circumferential end side. A second engaging portion 51 where the second one end side projecting portion 31b is brought into abutment with a first other end side projecting portion 42 in the axial direction is inclined axially inwards as it extends towards the one circumferential end side.

Consequently, in addition to the advantage of the third embodiment, the fourth embodiment can provide the advantage of the second embodiment.

In this embodiment, groove portions 33a, 33b (refer to FIGS. 6 and 7) are not provided in the first and second one end side projecting portions 31a, 31b and the first and second other end side projecting portions 42a, 42b. This configuration is preferred when the production cost needs to be reduced or when no grove portions 33a, 33b are necessary in design. Similar to the third embodiment, groove portions 33a, 33b may be provided in the first and second one end side projecting portions 31a, 31b and the first and the second other end side projecting portion 42a, 42b.

Fifth Embodiment

Next, a radial roller bearing cage according to a fifth embodiment of the invention will be described. A basic configuration of the radial roller bearing cage of this embodiment is the same as that of the first embodiment (refer to FIGS. 1 and 2), and like reference numerals will be given to like or corresponding portions to those of the first embodiment, so that the description thereof will be omitted or simplified herein.

Figure 9:
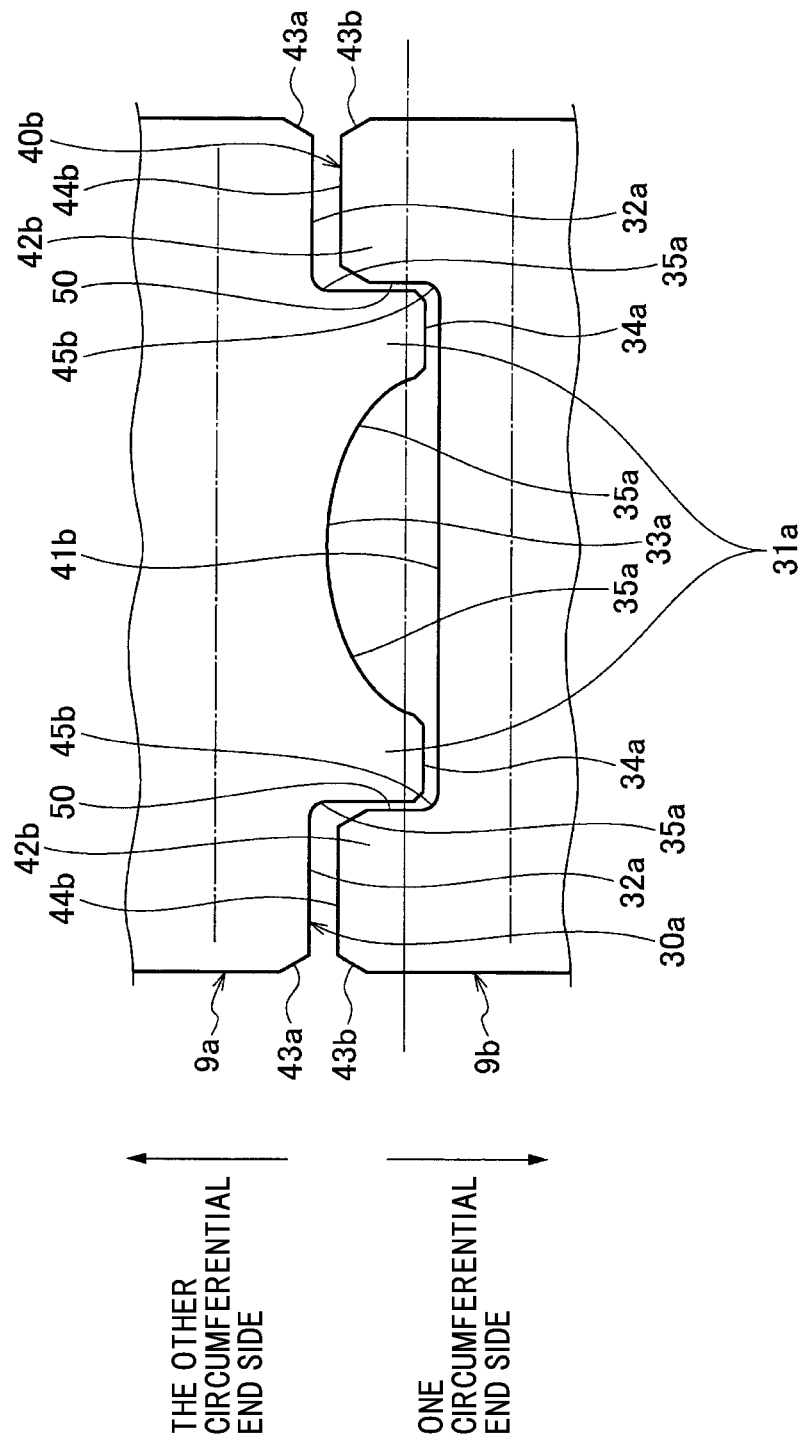
FIG. 9 shows a view of a main part of a radial roller bearing cage according to a fifth embodiment as viewed from a radially outer side thereof.

As shown in FIG. 9, in this embodiment, a groove portion 33a is given an arc-like shape, whereby the roundness of root portions 35a of a first one end side projecting portion 31a becomes great, thereby making it possible to improve the strength of the roots 35a. The groove portions 33a, 33b that have been described before and groove portions 33a, 33b that will be described later may be given an arc-like shape as in this embodiment.

The other advantages of this embodiment are similar to those of the first embodiment.

Sixth Embodiment

Next, a radial roller bearing cage according to a sixth embodiment of the invention will be described. A basic configuration of the radial roller bearing cage of this embodiment is the same as that of the second embodiment (refer to FIGS. 4 and 5), and like reference numerals will be given to like or corresponding portions to those of the second embodiment, so that the description thereof will be omitted or simplified herein.

Figure 10:
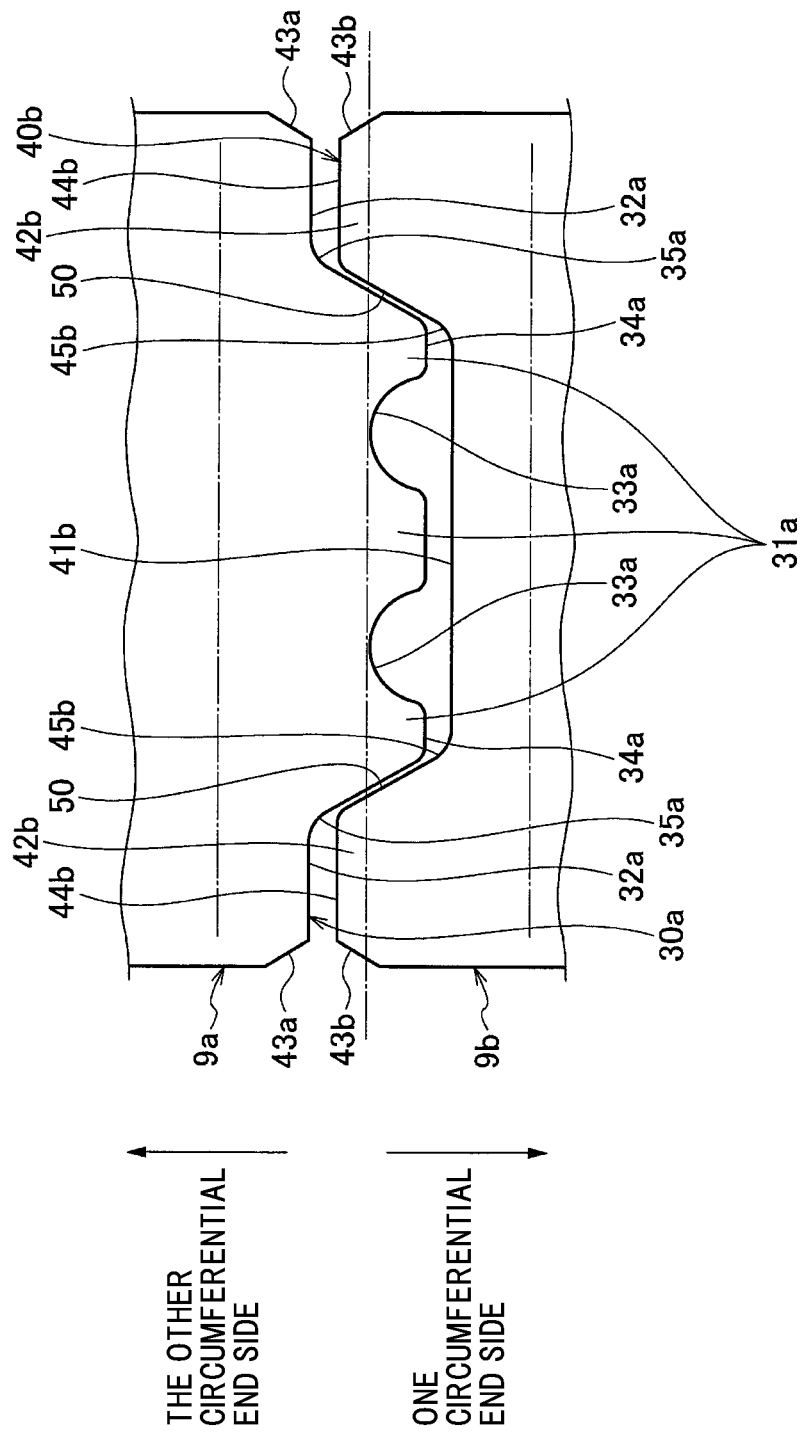
FIG. 10 shows a view of a main part of a radial roller bearing cage according to a sixth embodiment as viewed from a radially outer side thereof.

As shown in FIG. 10, in this embodiment, two groove portions 33a are provided in a first one end side projecting portion 31a so as to lie adjacent to each other in an axial direction. By adopting this configuration, lubricant in the groove portions 33a is stirred more, thereby making it possible to suppress the wear of cage elements further.

The number of groove portions 33a is not limited to two, hence three or more groove portions may be provided. The numbers of groove portions 33a, 33b that have been described before and groove portions 33a, 33b that will be described later may the same number as that in this embodiment, that is, two or more.

The other advantages of this embodiment are the same as those provided by the second embodiment.

Seventh Embodiment

Next, a radial roller bearing cage according to a seventh embodiment of the invention will be described. A basic configuration of the radial roller bearing cage of this embodiment is the same as that of the first embodiment (refer to FIGS. 1 and 2), and like reference numerals will be given to like or corresponding portions to those of the first embodiment, so that the description thereof will be omitted or simplified herein.

Figure 11:
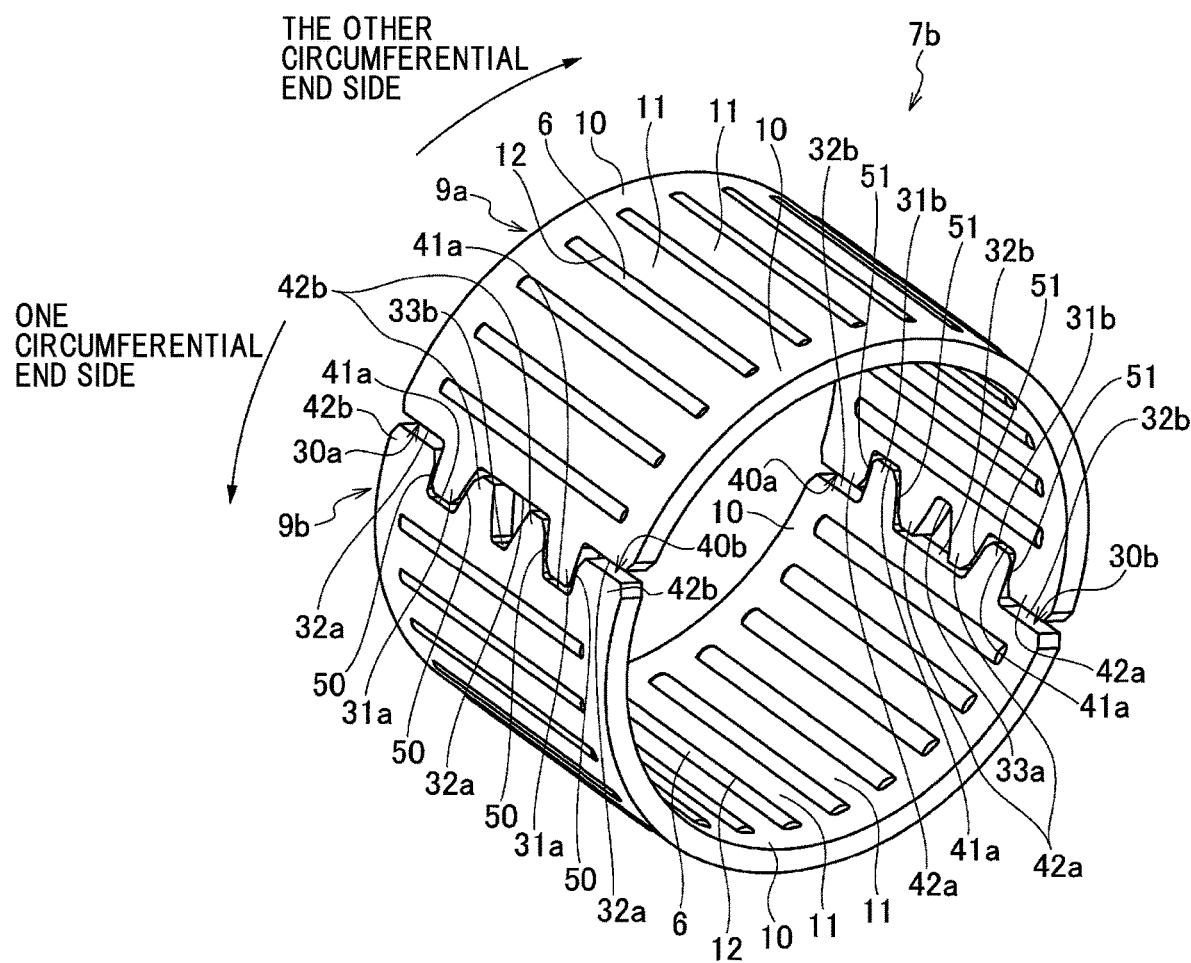
FIG. 11 is a perspective view of a radial roller bearing cage according to a seventh embodiment.
Figure 12:
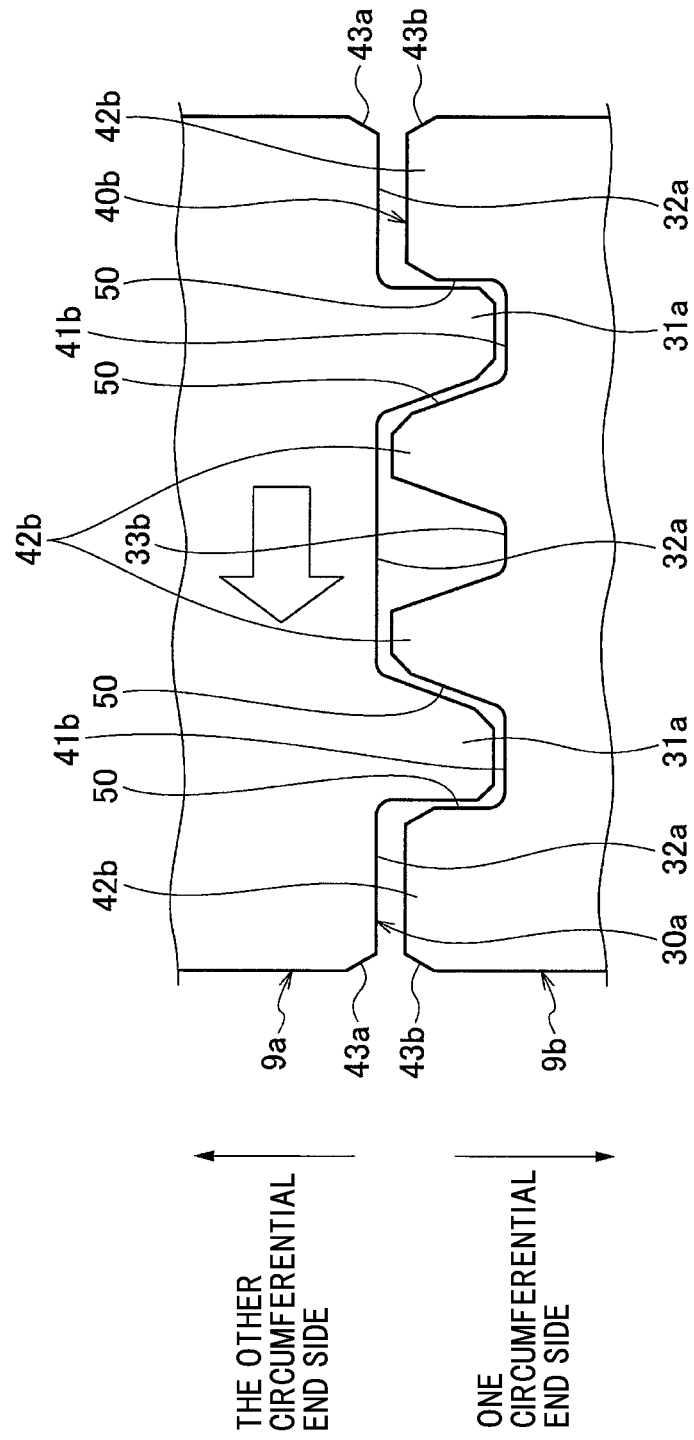
FIG. 12 shows a view of a main part of the radial roller bearing cage shown in FIG. 11 as viewed from a radially outer side thereof.

As shown in FIGS. 11 and 12, in this embodiment, circumferential end faces 30a, 30b of first and second cage elements 9a, 9b include three first and second one end side recess portions 32a, 32b and two first and second one end side projecting portions 31a, 31b, the first and second one end side recess portions 32a, 32b and the first and second one end side projecting portions 31a, 31b being formed alternately and continuously on the circumferential end faces 30a, 30b, respectively.

The other circumferential end faces 40a, 40b of the first and second cage elements 9a, 9b include three first and second other end side projecting portions 42a, 42b and two first and second other end side recess portions 41a, 41b, the first and second other end side projecting portions 42a, 42b and the first and second other end side recess portions 41a, 41b being formed alternately and continuously on the other circumferential end faces 40a, 40b, respectively. The first and second other end side recess portions 41a, 41b are formed so as to face the second and first one end side projecting portions 31b, 31a in a circumferential direction, respectively. The first and second other end side projecting portions 42a, 42b are formed so as to face the second and first one end side recess portions 32b, 32a in the circumferential direction, respectively.

In FIG. 12, only peripheries of the circumferential end face 30a of the first cage element 9a and the other circumferential end face 40b of the second cage element 9b are shown. However, the circumferential end face 30b of the second cage element 9b has substantially the same construction as that of the circumferential end face 30a of the first cage element 9a, and the other circumferential end face 40a of the first cage element 9a has substantially the same construction as that of the other circumferential end face 40b of the second cage element 9b. Consequently, a detailed illustration of the circumferential end face 30b of the second cage element 9b and the other circumferential end face 40a of the first cage element 9a will be omitted here.

In the three first and second other end side projecting portions 42a, 42b, groove portions 33a, 33b are formed in the first and second other end side projecting portions 42a, 42b so as to be recessed that are located in axial middle portions. A radially inner side and a radially outer side of the cage 7b are allowed to communicate with each other via these groove portions 33a, 33b.

The first one end side projecting portions 31a fit in the second other end side recess portions 41b, and the second other end side projecting portions 42b fit in the first one end side recess portions 32a. This brings the first one end side projecting portions 31a and the second other end side projecting portions 42b, which lie adjacent to each other in an axial direction, into abutment with each other in the axial direction to thereby form four first engaging portions 50.

The second one end side projecting portions 31b fit in the first other end side recess portions 41a, and the first other end side projecting portions 42a fit in the second one end side recess portions 32b. This brings the second one end side projecting portions 31b and the first other end side projecting portions 42a, which lie adjacent to each other in the axial direction, into abutment with each other in the axial direction to thereby form four second engaging portions 51.

Consequently, in the event that an external force (refer to an arrow in FIG. 12) is exerted on the first cage element 9a from one axial side to the other axial side (from a right hand side to a left hand side in FIGS. 11 and 12), in the four first and second engaging portions 50, 51, the external force is borne by the two first engaging portions 50 and the two second engaging portions 51 that are each located in a first and third positions from the other axial side. Consequently, compared with the first embodiment where the external force is borne by one of the two first engaging portions 50 and one of the two second engaging portions 51, the load exerted on the cage 7b can be dispersed well.

In the four first engaging portions 50 and the four second engaging portions 51, the two first engaging portions 50 and the two second engaging portions 51 that are each located in the second and third positions from the other axial side are formed so as to be inclined axially inwards as they extend towards the one circumferential end side. Thus, this embodiment can provide the same advantage as that of the second embodiment (refer to FIGS. 4 and 5).

The other advantages of this embodiment are the same as those provided by the first embodiment.

Eighth Embodiment

Next, a radial roller bearing cage according to an eighth embodiment of the invention will be described. A basic configuration of the radial roller bearing cage of this embodiment is the same as that of the seventh embodiment (refer to FIGS. 11 and 12), and like reference numerals will be given to like or corresponding portions to those of the seventh embodiment, so that the description thereof will be omitted or simplified herein.

Figure 13:
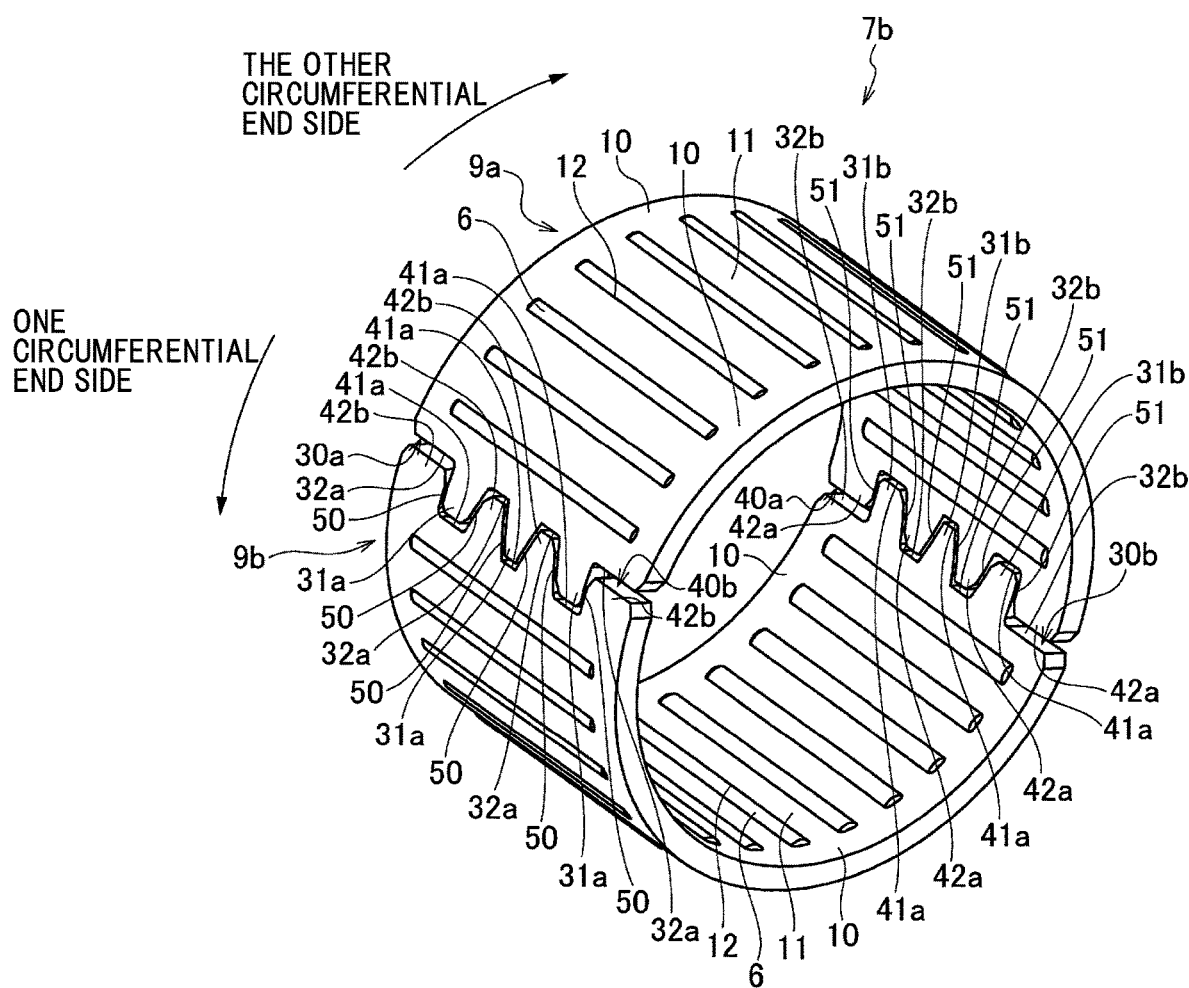
FIG. 13 is a perspective view of a radial roller bearing cage according to an eighth embodiment.
Figure 14:
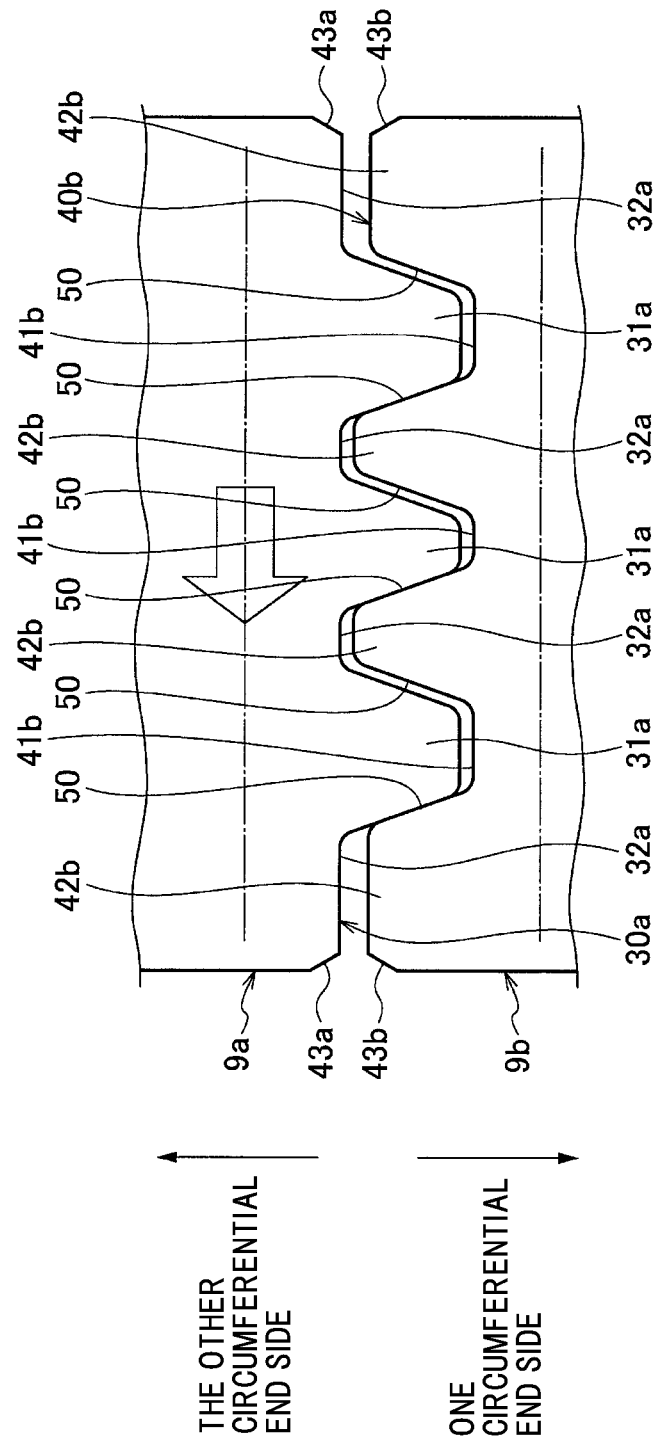
FIG. 14 shows a view of a main part of the radial roller bearing cage shown in FIG. 13 as viewed from a radially outer side thereof.

As shown in FIGS. 13 and 14, in this embodiment, circumferential end faces 30a, 30b of first and second cage elements 9a, 9b include four first and second one end side recess portions 32a, 32b and three first and second one side projecting portions 31a, 31b, the first and second one end side recess portions 32a, 32b and the first and second one end side projecting portions 31a, 31b being formed alternately and continuously on the circumferential end faces 30a, 30b, respectively.

The other circumferential end faces 40a, 40b of the first and second cage elements 9a, 9b include four first and second other end side projecting portions 42a, 42b and three first and second other end side recess portions 41a, 41b, the first and second other end side projecting portion 42a, 42b and the first and second other end side recess portions 41a, 41b being formed alternately and continuously on the other circumferential end faces 40a, 40b, respectively. The first and second other end side recess portions 41a, 41b are formed so as to face the second and first one end side projecting portions 31b, 31a in a circumferential direction, respectively. The first and second other end side projecting portions 42a, 42b are formed so as to face the second and first one end side recess portions 32b, 32a, respectively, in the circumferential direction.

In FIG. 14, only peripheries of the circumferential end face 30a of the first cage element 9a and the other circumferential end face 40b of the second cage element 9b are shown. However, the circumferential end face 30b of the second cage element 9b has substantially the same construction as that of the circumferential end face 30a of the first cage element 9a, and the other circumferential end face 40a of the first cage element 9a has substantially the same construction as that of the other circumferential end face 40b of the second cage element 9b. Consequently, a detailed illustration of the circumferential end face 30b of the second cage element 9b and the other circumferential end face 40a of the first cage element 9a will be omitted here.

The first one end side projecting portions 31a fit in the second other end side recess portions 41b, and the second other end side projecting portions 42b fit in the first one end side recess portions 32a. This brings the first one end side projecting portions 31a and the second other end side projecting portions 42b, which lie adjacent to each other in an axial direction, into abutment with each other in the axial direction to thereby form six first engaging portions 50.

The second one end side projecting portions 31b fit in the first other end side recess portions 41a, and the first other end side projecting portions 42a fit in the second one end side recess portions 32b. This brings the second one end side projecting portions 31b and the first other end side projecting portions 42a, which lie adjacent to each other in the axial direction, into abutment with each other in the axial direction to thereby form six second engaging portions 51.

Consequently, an external force (refer to an arrow in FIG. 14) is exerted on the first cage element 9a from one axial side to the other axial side (from a right hand side to a left hand side in FIGS. 13 and 11), in the six first engaging portions 50 and six second engaging portions 51, the three first engaging portions 50 and three second engaging portions 51 that are each located in the first, third and fifth positions from the other axial side bear the external force. Consequently, compared with the seventh embodiment in which in the four first engaging portions 50 and four second engaging portions 51, the two first engaging portions and two second engaging portions bear the external force, the load exerted on the cage 7b can be dispersed well.

The six first engaging portions 50 and six second engaging portions 51 are formed so as to be inclined in the axial direction as they extend towards the circumferential direction, and therefore, the eighth embodiment can provide the same advantage as that provided by the second embodiment (refer to FIGS. 4 and 5).

The other advantages of this embodiment are the same as those provided by the seventh embodiment.

Ninth Embodiment

Next, a radial roller bearing cage according to a ninth embodiment of the invention will be described. A basic configuration of the radial roller bearing cage of this embodiment is the same as that of the eighth embodiment (refer to FIGS. 13 and 14), and like reference numerals will be given to like or corresponding portions to those of the eighth embodiment, so that the description thereof will be omitted or simplified herein.

Figure 15:
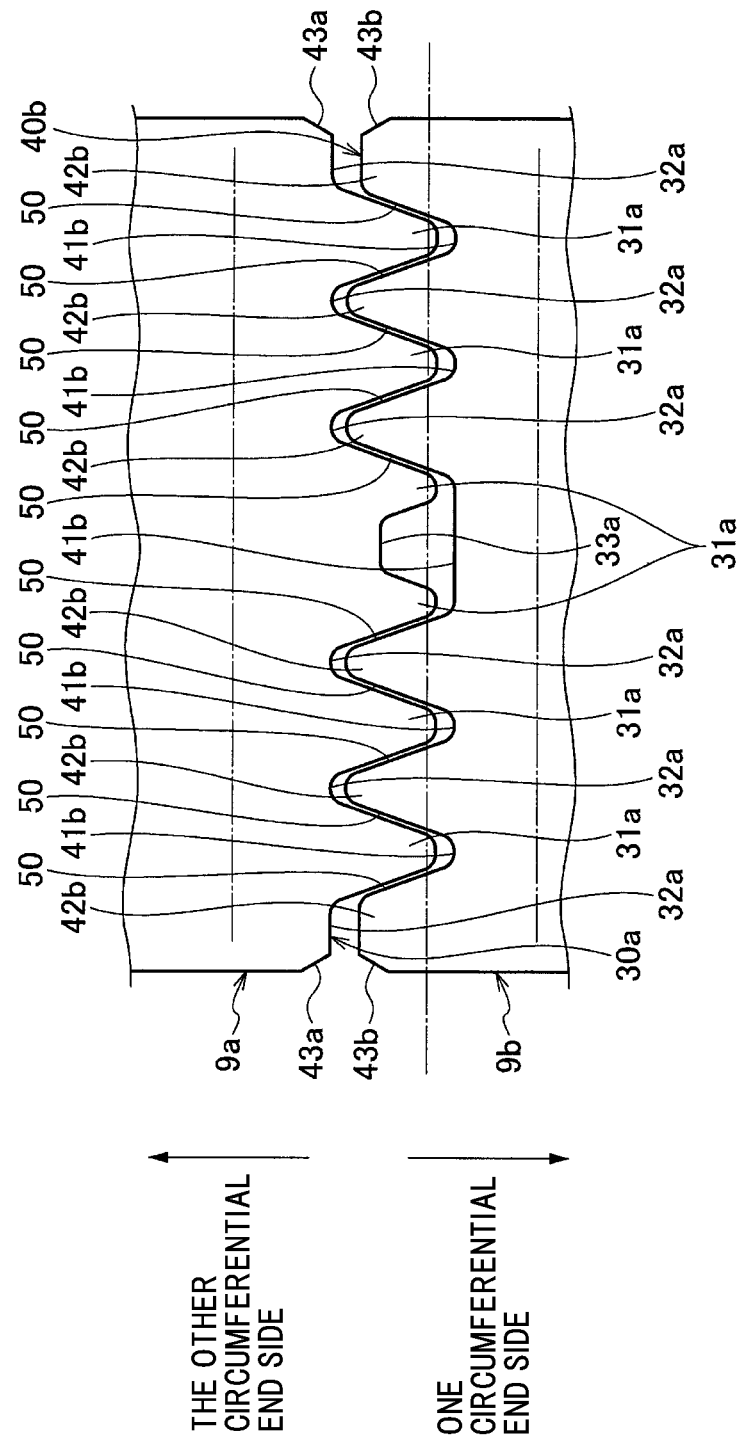
FIG. 15 shows a view of a main part of a radial roller bearing cage according to a ninth embodiment as viewed from a radially outer side thereof.

As shown in FIG. 15, in this embodiment, a first circumferential end face 30a includes six first one end side recess portions 32a and five first one end side projecting portions 31a, the first one end side recess portions 32a and the first one end side projecting portions 31a being formed alternately and continuously on the first circumferential end face 30a.

The other circumferential end face 40b of a second cage element 9b includes six second other end side projecting portions 42b and five second other end side recess portions 41b, the second other end side projecting portions 42b and the second other end side projecting portions 41b being formed alternately and continuously on the other circumferential end face 40b. The second other end side recess portions 41a, 41b are formed so as to face the first one end side projecting portions 31a in a circumferential direction. The second other end side projecting portions 42b are formed so as to face the first one end side recess portions 32a in the circumferential direction.

In FIG. 15, only peripheries of the circumferential end face 30a of a first cage element 9a and the other circumferential end face 40b of the second cage element 9b are shown. However, a circumferential end face 30b of the second cage element 9b has substantially the same construction as that of the circumferential end face 30a of the first cage element 9a, and the other circumferential end face 40a of the first cage element 9a has substantially the same construction as that of the other circumferential end face 40b of the second cage element 9b. Consequently, a detailed illustration of the circumferential end face 30b of the second cage element 9b and the other circumferential end face 40a of the first cage element 9a will be omitted here.

The first one end side projecting portions 31a fit in the second other end side recess portions 41b, and the second other end side projecting portions 42b fit in the first one end side recess portions 32a. This brings the first one end side projecting portions 31a and the second other end side projecting portions 42b, which lie adjacent to each other in an axial direction, into abutment with each other in the axial direction to thereby form 10 first engaging portions 50.

Although not shown, second one end side projecting portions 31b fit in first other end side recess portions 41a, and first other end side projecting portions 42a fit in second one end side recess portions 32b. This brings the second one end side projecting portions 31b and the first other end side projecting portions 42a, which lie adjacent to each other in the axial direction, into abutment with each other in the axial direction to thereby form 10 second engaging portions 51.

Consequently, in the event that an external force (refer to an arrow in FIG. 15) is exerted on the first cage element 9a from one axial side to the other axial side (from a right hand side to a left hand side in FIG. 15), in the 10 first engaging portions 50 and 10 second engaging portions 51, the five first engaging portions 50 and five second engaging portions 51 that are each located in first, third, fifth, seventh and ninth positions from the other axial side bear the external force. Consequently, compared with the seventh embodiment in which in the six first engaging portions 50 and six second engaging portions 51, the three first engaging portions 50 and three second engaging portions 51 bear the external force, the load exerted on the cage 7b of this embodiment can be dispersed well.

The 10 first engaging portions 50 and 10 second engaging portions 51 are formed so as to be inclined in the axial direction as they extend towards the circumferential direction, and therefore, this embodiment can provide the same advantage as that provided by the second embodiment (refer to FIGS. 4 and 5).

A groove portion 33a is formed in the first one end side projecting portion 31a that lies in an axial middle position, whereby an amount of lubricant that flows in a radial direction can be increased.

The other advantages of this embodiment are the same as those provided by the seventh embodiment.

Tenth Embodiment

Next, a radial roller bearing cage according to a tenth embodiment of the invention will be described. A basic configuration of the radial roller bearing cage of this embodiment is the same as that of the first embodiment (refer to FIGS. 1 and 2), and like reference numerals will be given to like or corresponding portions to those of the first embodiment, so that the description thereof will be omitted or simplified herein.

Figure 16:
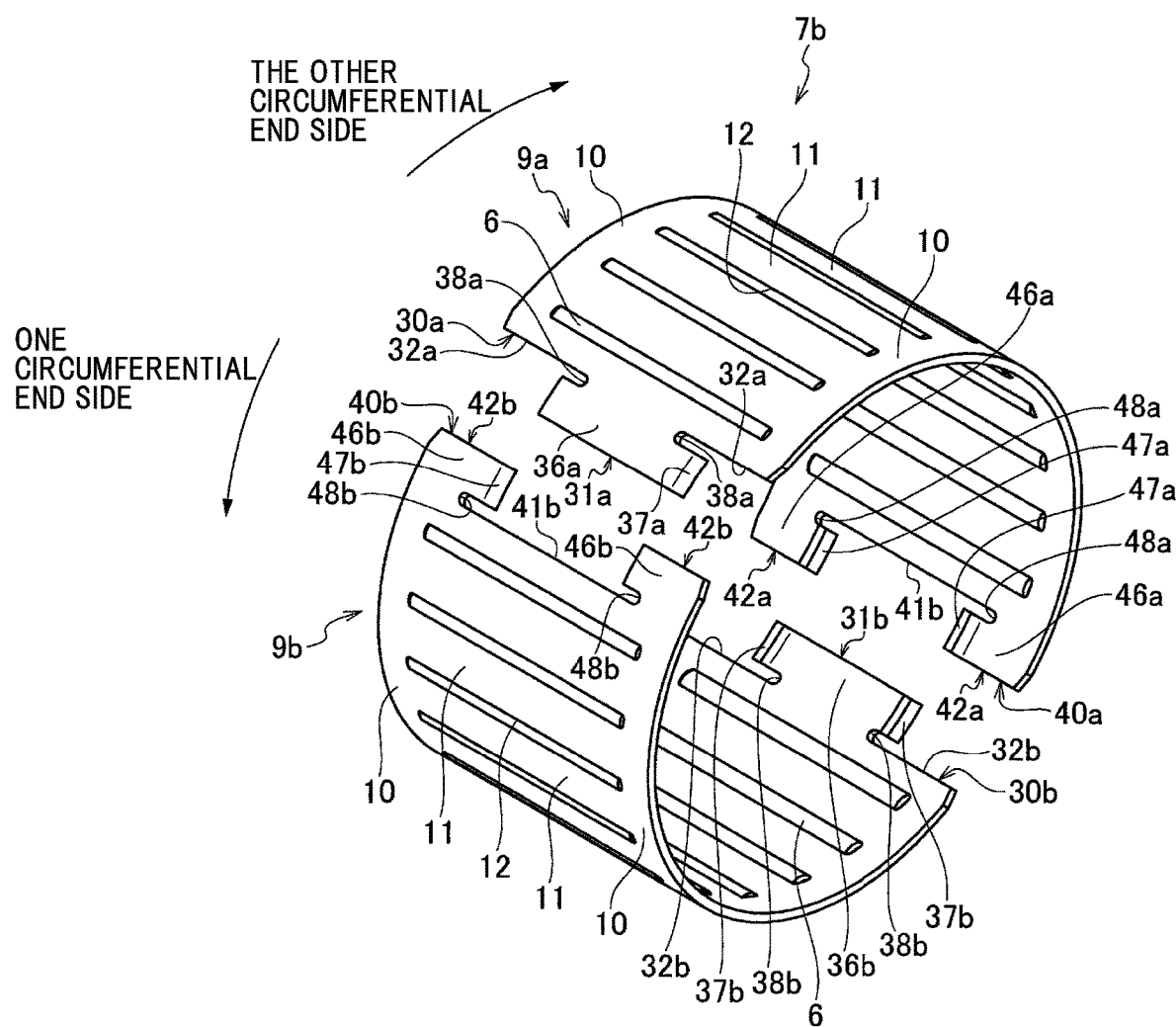
FIG. 16 is a perspective view of a radial roller bearing cage according to a tenth embodiment.
Figure 17:
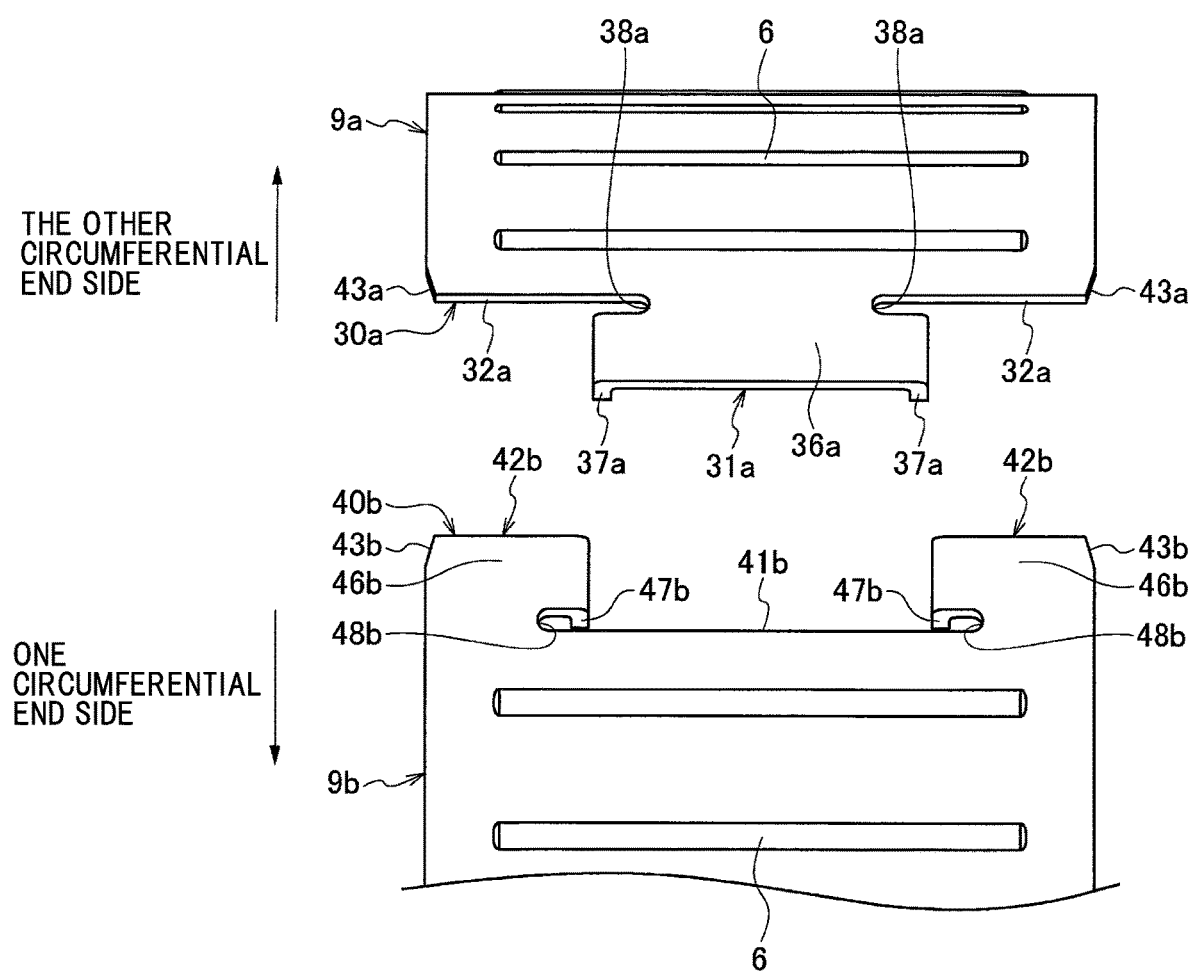
FIG. 17 shows a view of a main part of the radial roller bearing cage shown in FIG. 16 as viewed from a radially outer side thereof.

As shown in FIGS. 16 and 17, in this embodiment, circumferential end faces 30a, 30b of first and second cage elements 9a, 9b include two (at both axial sides) first and second one end side recess portions 32a, 32b and one of first and second one end side projecting portions 31a, 31b (each at an axial middle portion), the first and second one end side recess portions 32a, 32b and the first and second one end side projecting portions 31a, 31b being formed alternately and continuously on the circumferential end faces 30a, 30b, respectively.

The other circumferential end faces 40a, 40b of the first and second cage elements 9a, 9b include two (at both axial sides) first and second other end side projecting portions 42a, 42b and one of first and second other end side recess portions 41a, 41b (each at an axial middle portion), the first and second other end side projecting portions 42a, 42b and the first and second other end side recess portions 41a, 41b being formed alternately and continuously on the other circumferential end faces 40a, 40b, respectively. The first and second other end side recess portions 41a, 41b are formed so as to face the second and first one end side projecting portions 31b, 31a in a circumferential direction, respectively. The first and second other end side projecting portions 42a, 42b are formed so as to face the second and first one end side recess portions 32b, 32a in the circumferential direction, respectively.

Figure 18:
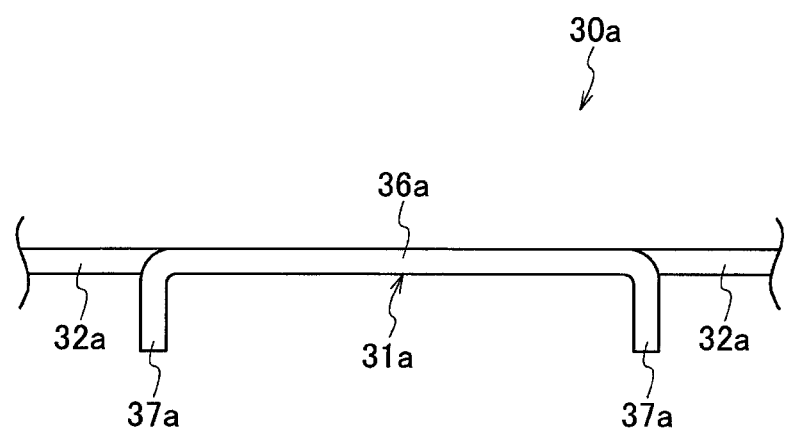
FIG. 18 shows a view of a circumferential end face of a first cage element as viewed from a circumferential direction.

Here, referring to FIG. 18, too, the first and second one end side projecting portions 31a, 31b have arc portions 36a, 36b that extend into an arc-like shape in the circumferential direction, pairs of flange portions 37a, 37b that are provided so as to project radially inwards from both axial side end portions of the arc portions 36a, 36b, and pairs of notched portions 38a, 38b that are formed by cutting out connecting portions with the circumferential end faces 30a, 30b from both axial sides.

Figure 19:
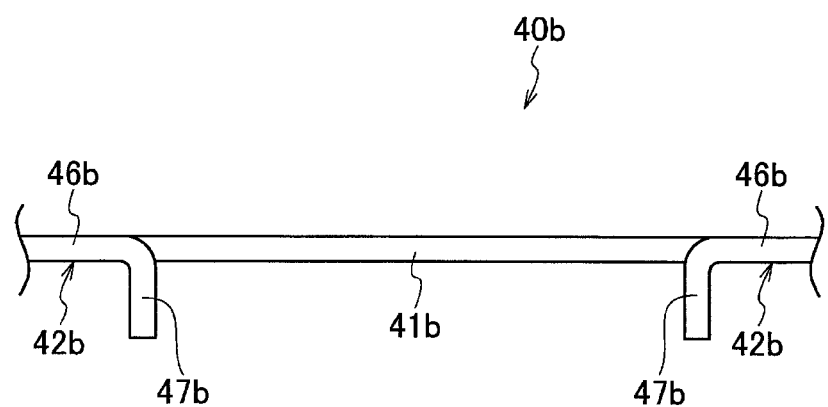
FIG. 19 shows a view of the other circumferential end face of a second cage element as viewed from the circumferential direction.
Figure 20:
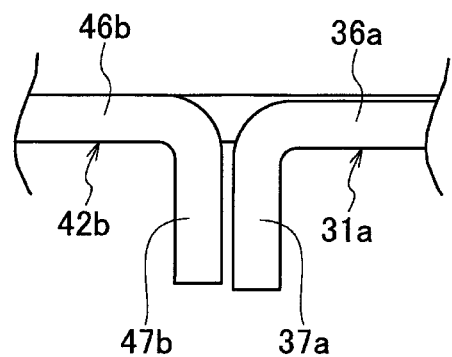
FIG. 20 shows a view showing an engagement of a first one end side projecting portion with a second other end side projecting portion.

Referring to FIG. 19, too, the first and second other end side projecting portions 42a, 42b have arc portions 46a, 46b that extend into an arc-like shape in the circumferential direction, flange portions 47a, 47b that are provided so as to project radially inwards from axially inward end portions of the arc portions 46a, 46b, and notched portions 48a, 48b making a pair that are formed by cutting out connecting portions with the other circumferential end faces 40a, 40b from axial inward sides.

In FIGS. 17 to 20, only peripheries of the circumferential end face 30a of the first cage element 9a and the other circumferential end face 40b of the second cage element 9b are shown. However, the circumferential end face 30b of the second cage element 9b has substantially the same construction as that of the circumferential end face 30a of the first cage element 9a, and the other circumferential end face 40a of the first cage element 9a has substantially the same construction as that of the other circumferential end face 40b of the second cage element 9b. Consequently, a detailed illustration of the circumferential end face 30b of the second cage element 9b and the other circumferential end face 40a of the first cage element 9a will be omitted here.

Then, the first one end side projecting portion 31a fits in the second other end side recess portion 41b, and the second other end side projecting portions 42b fit in the first one end side recess portions 32a. This brings the flange portions 37a of the first one end side projecting portion 31a and the flange portions 47b of the second other end side projecting portions 42b that lie adjacent to each other in an axial direction into abutment with each other in the axial direction for engagement (refer to FIG. 20).

The second one end side projecting portion 31b fits in the first other end side recess portion 41a, and the first other end side projecting portions 42a fit in the second other end side recess portions 32b. This brings the flange portions 37b of the second one end side projecting portion 31b and the flange portions 47a of the first other end side projecting portions 42a that lie adjacent to each other in the axial direction into abutment with each other in the axial direction for engagement.

Consequently, in the event that an external force is exerted axially on the cage 7b, the flange portions 37a, 47b of the first one end side projecting portion 31a and the second other end side projecting portions 42b and the flange portions 37b, 47a of the second one end side projecting portion 31b and the first other end side projecting portions 42a bear the external force. Consequently, compared with the first embodiment, since the contact areas of the engaging portions are increased, this embodiment is advantageous in reducing the wear of the cage elements.

Figure 21:
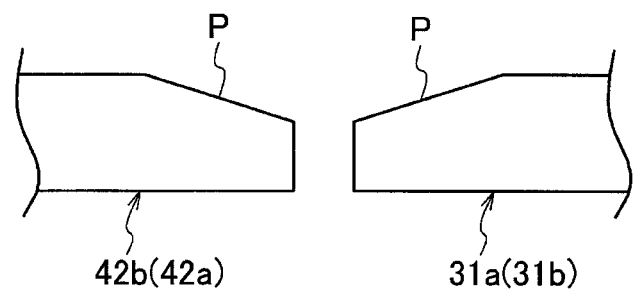
FIG. 21 shows a view showing a first one end side projecting portion and a second other end side projecting portion of the first embodiment.
Figure 22:
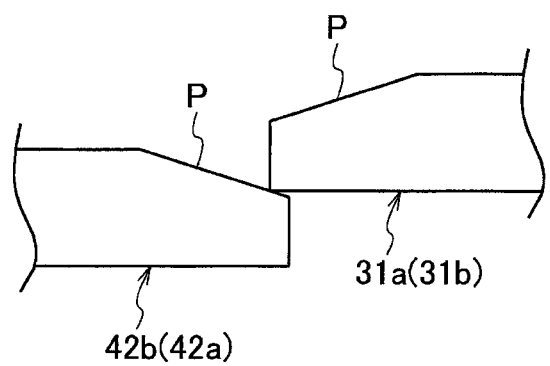
FIG. 22 shows a view showing the first one end side projecting portion and the second other end side projecting portion of the first embodiment.
Figure 23:
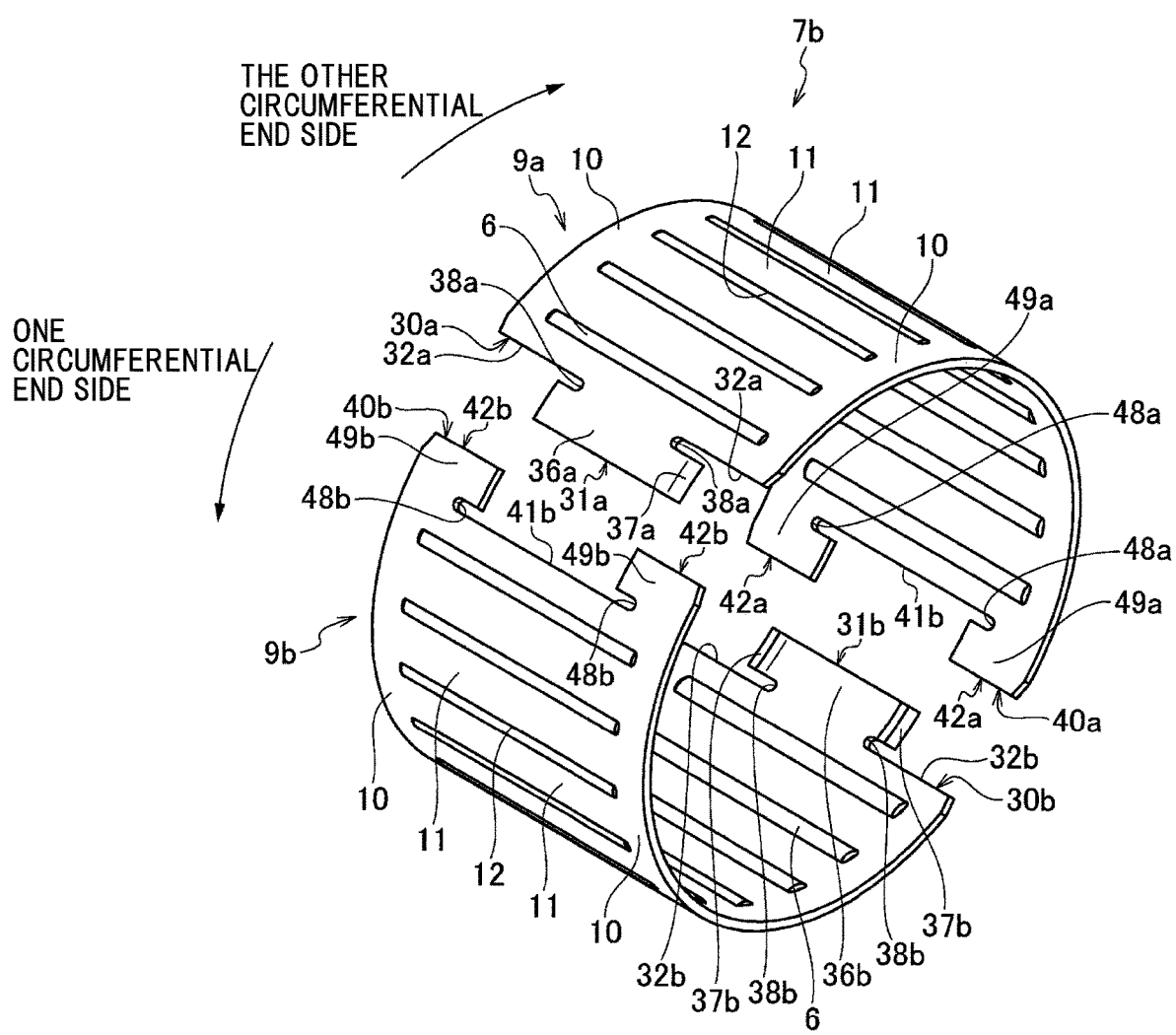
FIG. 23 is a perspective view of a radial roller bearing cage according to an eleventh embodiment.
Figure 24:
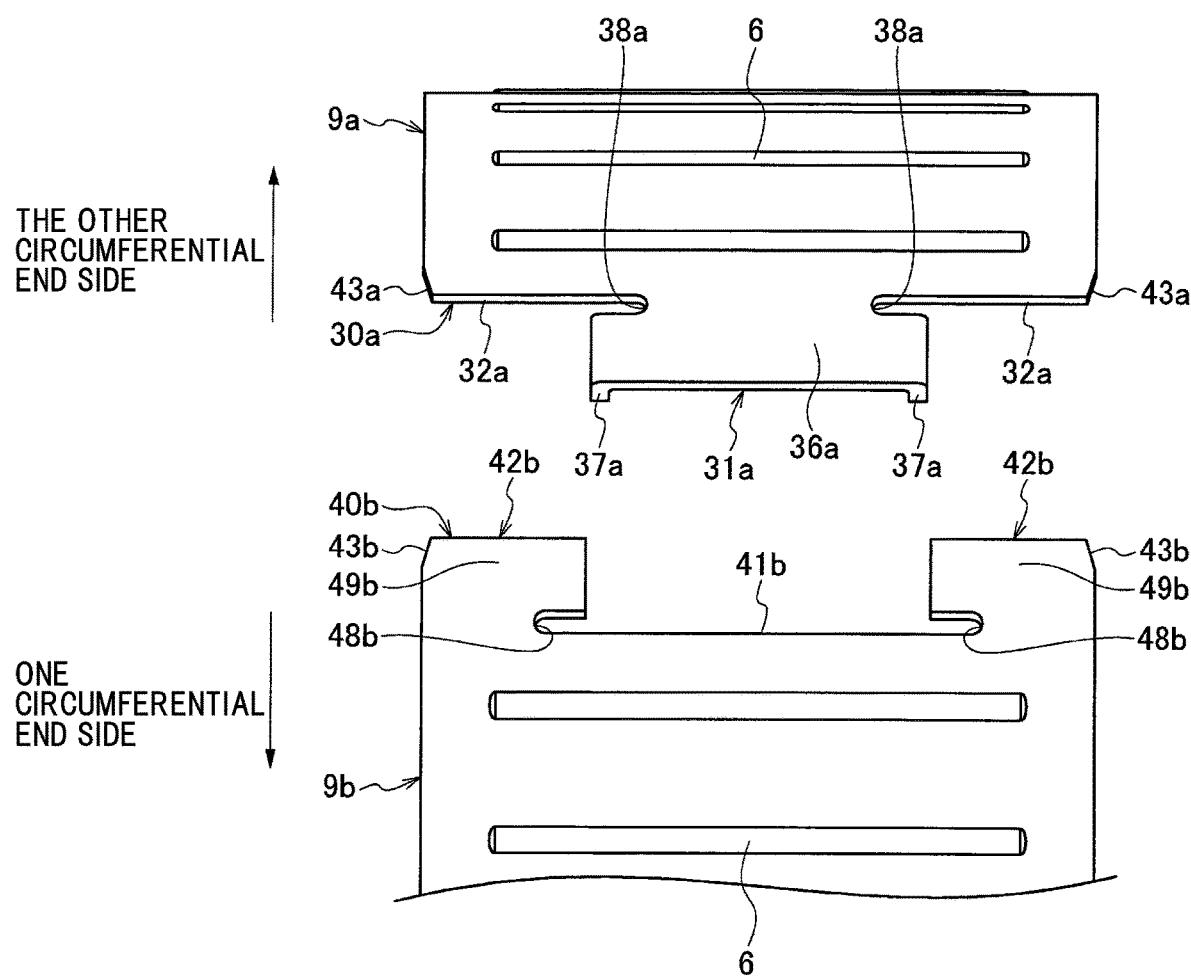
FIG. 24 shows a view of a main part of the radial roller bearing cage shown in FIG. 23 as viewed from a radially outer side thereof.
Figure 25:
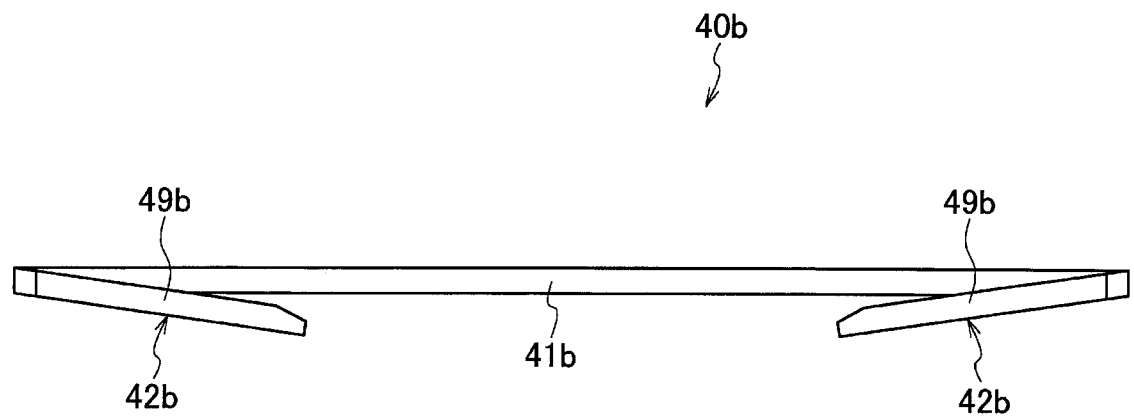
FIG. 25 shows a view showing the other circumferential end face of a second cage element as viewed from a circumferential direction.
Figure 26:
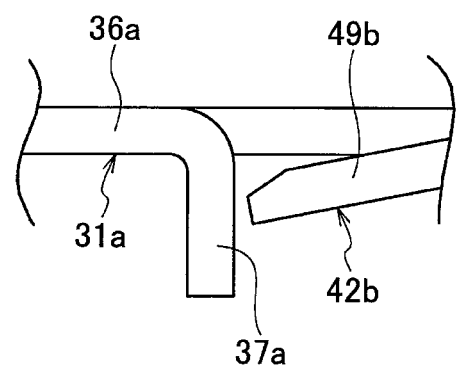
FIG. 26 shows a view showing an engagement of a first one end side projecting portion with a second other end side projecting portion.
Figure 27:
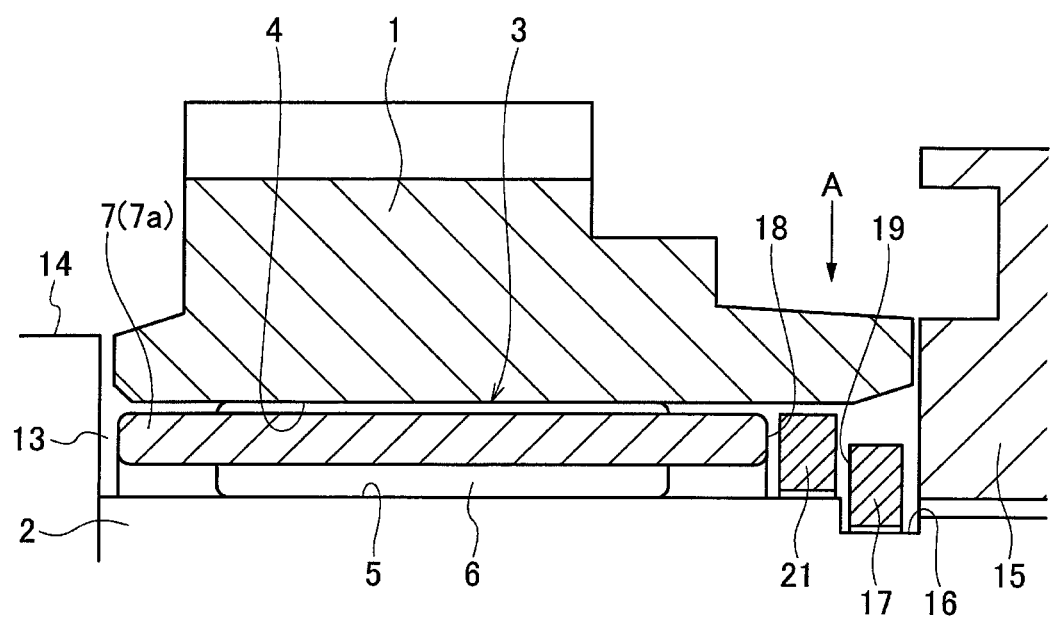
FIG. 27 is a sectional view showing a state in which a conventional radial roller bearing cage is incorporated in an automotive manual transmission.

In the embodiments that have been described above, too, as shown in FIG. 21, the first one end side projecting portion 31a and the second other end side projecting portions 42b (the second one end side projecting portion 31b and the first other end side projecting portions 42a) are brought into abutment with each other in the axial direction for engagement. As this occurs, there may be a situation where pressed sagging surfaces P are formed on the first one end side projecting portion 31a and the second other end side projecting portions 42b (the second one end side projecting portion 31b and the first other end side projecting portions 42a), and the flange portions 37a, 47b (37b, 47a) are not provided in those embodiments. For these reasons, on some occasions, it has been difficult for the sheared surfaces (the axial side surfaces) to be brought into abutment with each other. In addition, as shown in FIG. 22, there has been a situation in which the first one end side projecting portion 31a and the second other end side projecting portions 42b (the second one end side projecting portion 31b and the first other end side projecting portions 42a) ride on each other.

On the contrary to this, in this embodiment, since the first one end side projecting portion 31a and the second other end side projecting portions 42b (the second one end side projecting portion 31b and the first other end side projecting portions 42a) have the flange portions 37a, 47b (37b, 47a), the first one end side projecting portion 31a and the second other end side projecting portions 42b (the second one end side projecting portion 31b and the first other end side projecting portions 42a) can be brought into abutment with each other for engagement in an ensured fashion.

Eleventh Embodiment

Next, a radial roller bearing cage according to an eleventh embodiment of the invention will be described. A basic configuration of the radial roller bearing cage of this embodiment is the same as that of the tenth embodiment (refer to FIGS. 16 to 20), and like reference numerals will be given to like or corresponding portions to those of the tenth embodiment, so that the description thereof will be omitted or simplified herein.

As shown in FIGS. 23 to 26, first and second other end side projecting portions 42a, 42b of this embodiment have inclined portions 49a, 49b that are inclined radially inwards as they extend axially inwards and notched portions 48a, 48b each making a pair that are formed by cutting out connecting portions with the other circumferential end faces 40a, 40b from axially inward sides.

Consequently, flange portions 37a of a first one end side projecting portion 31a that lie adjacent in the axial direction and radially innermost portions of the inclined portions 49b of the second other end side projecting portions 42a are brought into abutment with each other in an axial direction for engagement. Flange portions 37b of a second one end side projecting portions 31b that lie adjacent in the axial direction and radially innermost portion of the inclined portion 49a of the first other end side projecting portions 42a are brought into abutment with each other for engagement.

In this embodiment, too, by adopting the configuration described above, it is possible to prevent the first one end side projecting portion 31a and the second other end side projecting portions 42b (the second one end side projecting portion 31b and the first other end side projecting portions 42a) from riding on each other for engagement in an ensured fashion.

The invention is not limited to the embodiments that have been described heretofore but can be modified or improved as required.

This patent application is based on Japanese Patent Application No. 2013-260242 filed on Dec. 17, 2013, the contents of which are incorporated herein by reference.

DESCRIPTION OF REFERENCE NUMERALS AND SIGNS

1: transmission gear
2: power transmission shaft
3: radial roller bearing
4: outer ring raceway
5: inner ring raceway
6: roller
7, 7a, 7b: radial roller bearing cage
9, 9a, 9b: cage element
10: rim portion
11: pillar portion
12: pocket
13: annular space
14: step portion
15: synchronizing hub
16: recessed groove 17: C-shaped snap ring (mating member)
18: one axial end face
19: the other axial end face (discontinuous surface)
20: discontinuous portion
21: flat washer
30a, 30b: circumferential end face
31a, 31b: one end side projecting portion
32a, 32b: one end side recess portion
33a, 33b: groove portion
34a: distal end face
35a: root
36a, 36b: arc portion
37a, 37b: flange portion
38a, 38b: notched portion
40a, 40b: the other circumferential end face
41a, 41b: the other end side recess portion
42a, 42b: the other end side projecting portion
43a, 43b: axial side end portion
44b: distal end face
45b: root
46a, 46b: arc portion
47a, 47b: flange portion
48a, 48b: notched portion
49a, 49b: inclined portion
50, 51: engaging portion
P: pressed sagging surface

The invention claimed is:

1. A radial roller bearing cage comprising first and second metallic cage elements each having a pair of arc-shaped rim portions that are disposed so as to be spaced apart from each other in an axial direction and a plurality of pillar portions that are disposed at constant intervals in a circumferential direction so as to connect the pair of rim portions in the axial direction, the first and second cage elements being assembled together to be formed into a cylindrical shape as a whole and in a circumferentially separable state from each other, the pillar portions that lie adjacent to one another in the circumferential direction and the pairs of rim portions defining a plurality of pockets in which rollers are held so as to roll freely, wherein:

circumferential end faces of the first and second cage elements each have at least one end side projecting portion that is provided so as to project towards one circumferential end side;

the other circumferential end faces of the first and second cage elements each have at least one other end side recess portion that is provided so as to be recessed towards the one circumferential end side;

the one end side projecting portion of the first cage element fits in the other end side recess portion of the second cage element;

the one end side projecting portion of the second cage element fits in the other end side recess portion of the first cage element, whereby the first cage element and the second cage element are restrained from being displaced relatively in the axial direction;

the one end side projecting portions of the first and second cage elements each have at least one groove portion that is provided at an axial middle portion thereof so as to be recessed towards the other circumferential end side;

the assembled first and second cage elements have a circumferential direction gap formed between the first cage element and the second cage element in a state where the first cage element and the second cage element are assembled with each other, and the circumferential direction gap is constituted by the groove portion and the recess portion;

the first cage element and the second cage element are displaceable relatively both in the one circumferential end side direction and other circumferential end side direction corresponding to the circumferential direction;

the one end side projection portion is provided at an axial middle portion of the circumferential end face;

the other end side recess portion is provided at the axial middle portion of the circumferential end face, and a pair of other end side projecting portions are provided at both axial sides of the other end side recess portion;

the one end side projection portion fits in the other end side recess portion in a state where a circumferential direction gap is constituted by the one end side projection portion and the other end side recess portion, and the pair of other end side projecting portions face the circumferential end face in a state where circumferential direction gaps are respectively constituted by the pair of other end side projecting portions and the circumferential end face;

a radially inner side and a radially outer side of the one end side projection portion communicate with each other by the groove portion; and engaging portions where the one end side projecting portion is brought into abutment with the other end side projecting portions in the axial direction are inclined axially inwards as the engaging portions extend towards the one circumferential end side.

* * * * *